(12) United States Patent
Fullerton et al.

(10) Patent No.: US 7,824,083 B2
(45) Date of Patent: Nov. 2, 2010

(54) CORRELATED MAGNETIC LIGHT AND METHOD FOR USING THE CORRELATED MAGNETIC LIGHT

(75) Inventors: Larry W. Fullerton, New Hope, AL (US); Mark D. Roberts, Huntsville, AL (US)

(73) Assignee: Cedar Ridge Research. LLC., New Hope, AL (US)

( * ) Notice: Subject to any disclaimer, the term of this patent is extended or adjusted under 35 U.S.C. 154(b) by 0 days.

(21) Appl. No.: 12/501,425

(22) Filed: Jul. 11, 2009

(65) Prior Publication Data

US 2009/0290363 A1 Nov. 26, 2009

Related U.S. Application Data

(63) Continuation-in-part of application No. 12/476,952, filed on Jun. 2, 2009, which is a continuation-in-part of application No. 12/322,561, filed on Feb. 4, 2009, which is a continuation-in-part of application No. 12/358,423, filed on Jan. 23, 2009, which is a continuation-in-part of application No. 12/123,718, filed on May 20, 2008.

(51) Int. Cl.
*F21V 21/00* (2006.01)
*H01F 7/02* (2006.01)

(52) U.S. Cl. ............. 362/398; 362/217.12; 362/217.13; 362/217.14; 335/306

(58) Field of Classification Search .................. 335/285, 335/302–306; 24/303; 310/90.5; 2/102–103, 2/312, 315, 319, 321, 322, 338, 422, 462, 2/913; 362/217.1–217.14, 398

See application file for complete search history.

(56) References Cited

U.S. PATENT DOCUMENTS 381,968 A 5/1888 Tesia (Continued)

FOREIGN PATENT DOCUMENTS

FR 823395 1/1938
WO 2007081830 A2 7/2007

OTHER PUBLICATIONS

"BNS Series-Compatible Series AES Safety Controllers"pp. 1-17, http://www.schmersalusa.com/safety_controllers/drawings/aes.pdf (downloaded on or before Jan. 23, 2009).
"Magnetic Safety Sensors"pp. 1-3, http://farnell.com/datasheets/6465.pdf (downloaded on or before Jan. 23, 2009).
"Series BNS-B20 Coded-Magnet Sensor Safety Door Handle" pp. 1-2, http://www.schmersalusa.com/catalog_pdfs/BNS_B20 pdf (downloaded on or before Jan. 23, 2009).

(Continued)

*Primary Examiner*—Ramon M Barrera
(74) *Attorney, Agent, or Firm*—Craig A. Hoersten; William J. Tucker

(57) ABSTRACT

A light and method are described herein that use correlated magnets to enable at least one end to be secured and removed from the body of the light. Some examples of such a light include a scuba light, an underwater light, a flashlight, a submersible pool light, an emergency light, a floating light, an aquarium light or a vehicle light. Furthermore the force created by the correlated magnets mounted on the at least one end and the body creates a seal there between to substantially isolate the interior portion of the light from materials and/or matter in its external environment. Additional correlated magnets mounted in the body of the light enable the light to be secured to numerous second objects such as but not limited to scuba harnesses, belts, gloves or storage racks.

22 Claims, 17 Drawing Sheets

U.S. PATENT DOCUMENTS

| | | |
|---|---|---|
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,570,625 A | 10/1951 | Zimmerman et al. |
| 2,722,617 A | 11/1955 | Cluwen et al. |
| 3,102,314 A | 9/1963 | Alderfer |
| 3,208,296 A | 9/1965 | Baermann |
| 3,288,511 A | 11/1966 | Tavano |
| 2,932,545 A | 4/1969 | Foley |
| 3,468,576 A | 9/1969 | Beyer et al. |
| 3,474,366 A | 10/1969 | Barney |
| 3,802,034 A | 4/1974 | Bookless |
| 4,079,558 A | 3/1978 | Gorham |
| 4,222,489 A | 9/1980 | Hutter |
| 4,453,294 A | 6/1984 | Morita |
| 4,547,756 A | 10/1985 | Miller et al. |
| 4,629,131 A | 12/1986 | Podell |
| 4,941,236 A | 7/1990 | Sherman |
| 5,050,276 A | 9/1991 | Pemberton |
| 5,367,891 A | 11/1994 | Furuyama |
| 5,383,049 A | 1/1995 | Carr |
| 5,631,093 A | 5/1997 | Perry et al. |
| 5,631,618 A | 5/1997 | Trumper et al. |
| 6,072,251 A | 6/2000 | Markle |
| 6,170,131 B1 | 1/2001 | Shin |
| 6,275,778 B1 | 8/2001 | Shimada et al. |
| 6,457,179 B1 | 10/2002 | Prendergast |
| 6,607,304 B1 | 8/2003 | Lake et al. |
| 6,720,698 B2 | 4/2004 | Galbraith |
| 6,847,134 B2 | 1/2005 | Frissen et al. |
| 6,848,807 B2 * | 2/2005 | Guerrieri ................. 362/155 |
| 6,862,748 B2 | 3/2005 | Prendergast |
| 6,927,657 B1 | 8/2005 | Wu |
| 6,971,147 B2 | 12/2005 | Haltstead |
| 7,066,778 B2 | 6/2006 | Kretzschmar |
| 7,362,018 B1 | 4/2008 | Kulogo et al. |
| 7,444,683 B2 | 11/2008 | Prendergast et al. |
| 7,559,667 B2 * | 7/2009 | Holderman ................. 362/131 |
| 2004/0003487 A1 | 1/2004 | Reiter |
| 2006/0066428 A1 | 3/2006 | McCarthy et al. |
| 2006/0189259 A1 | 8/2006 | Park |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

OTHER PUBLICATIONS

"Series BNS333 Coded-Magnet Sensors with integrated Safety Control Module" pp. 1-2, http://www.schmersalusa.com/machine_guarding/coded_magnet/drawings/bns333.pdf (downloaded on or before Jan. 23, 2009).

* cited by examiner

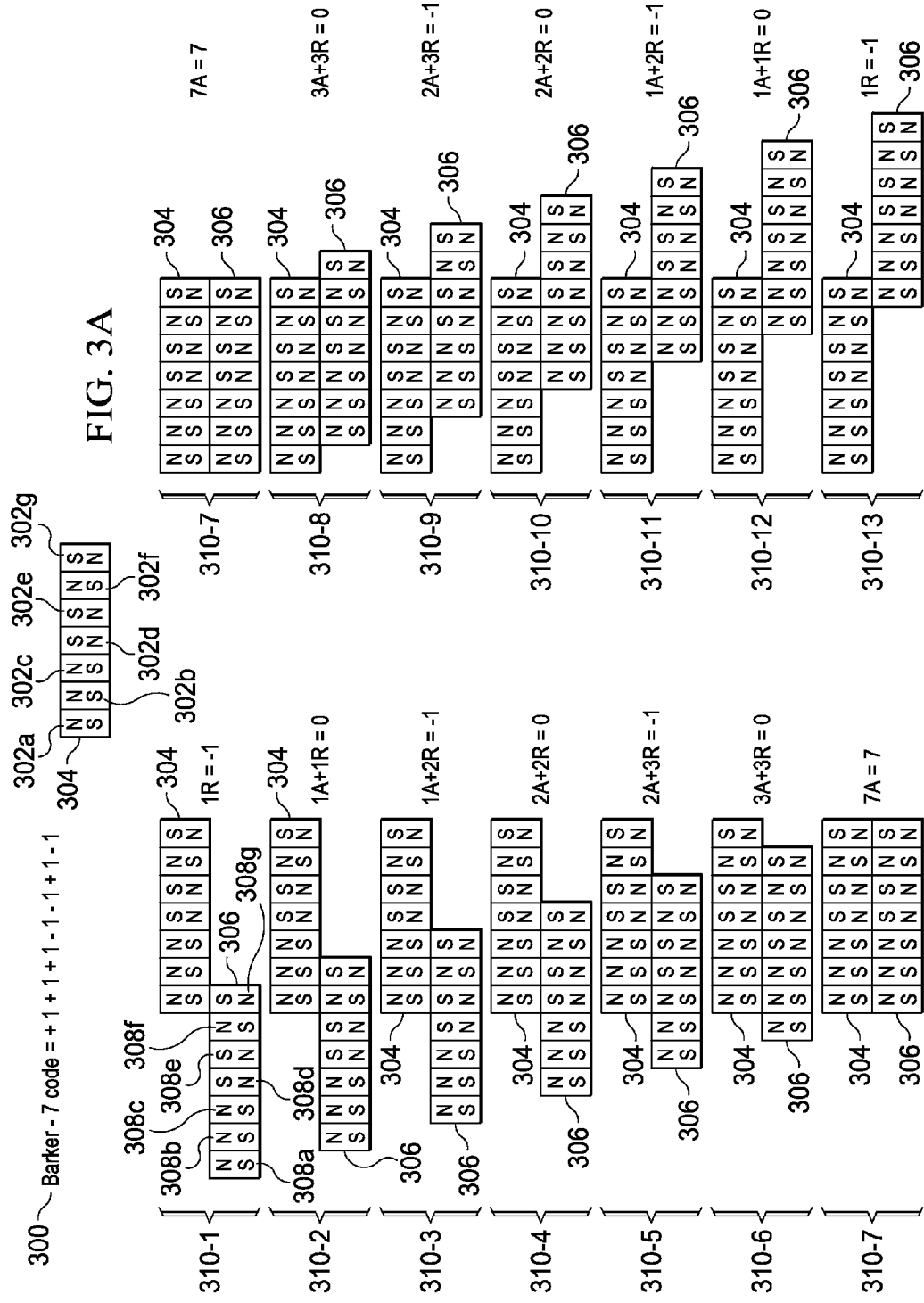

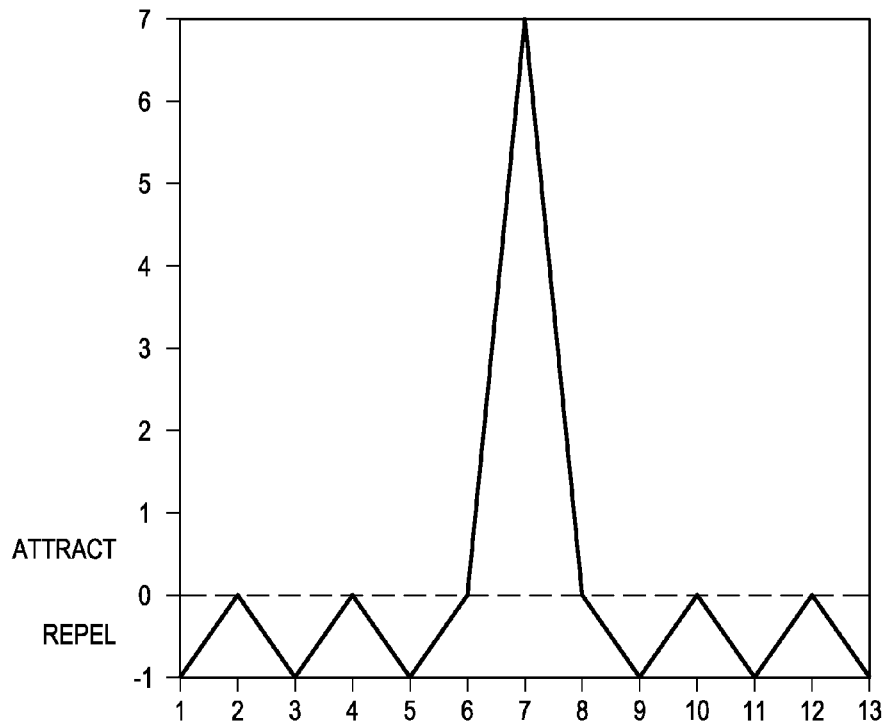
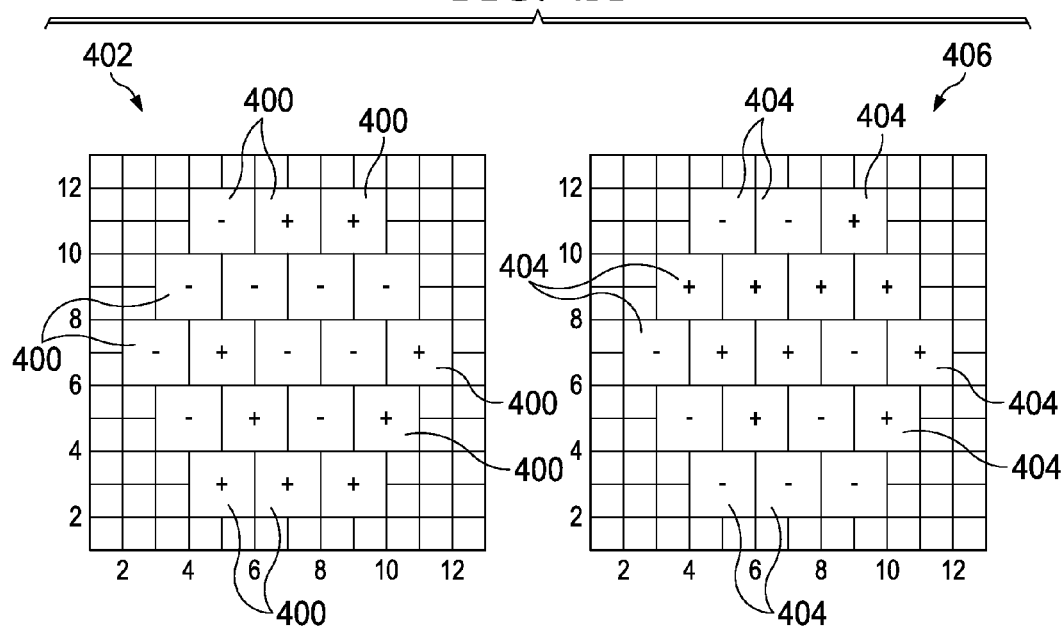

CORRELATED MAGNETIC LIGHT AND METHOD FOR USING THE CORRELATED MAGNETIC LIGHT

CROSS REFERENCE TO RELATED APPLICATION

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a light that uses correlated magnets that enable a person to easily secure and remove a sealed portion of the light permitting access to the interior of the light. Some examples of such a light include scuba lights and other under water lights, work lights, stage lights, shop lights, flashlights and other types of lights where it is desirable to seal and isolate the interior of the light from the surrounding environment or to permit access to the interior of the light such as for changing the light element, light assembly and power source. The present invention is demonstrated using underwater or scuba lights.

DESCRIPTION OF RELATED ART

Lights are utilized in numerous applications by a multitude of personnel. One specific application is underwater use where the interior of the light needs to be secured and sealed to prevent water from entering the interior of the light. Whether integrated into a recovery diver's helmet or as a standalone unit, recreational, professional and military divers utilize underwater lights. Underwater lights are designed to be waterproof and to provide access to the interior of the light, such as by having at least one end that is releasably secured and sealable to the main portion of the light in order to provide a user access to the interior of the light to facilitate the changing of the power source, such as batteries, and the light element.

During use, underwater lights are subjected to harsh environments that include extreme pressures, temperatures and other types of physical abuse. It is imperative that the mechanism facilitating the seal on the releasably secured portion be able to endure the environmental challenges and maintain the seal in order to prevent water from propagating into the light. Current technologies for releasably securing and sealing an end or access lid of the light utilize mating threads so the user can screw and unscrew the cap onto the body of the light. One problem with threaded ends occurs if the cap is not screwed on tight enough. This can prevent the creation of the proper watertight seal. Additionally, users can easily cross-thread the cap also resulting in an improper seal and thereby permitting leaking to occur which often renders the light inoperable. The threads have also been shown to loosen when exposed to different temperatures and physical abuse during underwater use.

Because the caps are screwed on, many lights are configured such that a spring is integrated into the releasably secured end. The spring functions to provide the electrical connection between the batteries and the light bulb and further to keep the batteries from moving within the body of the light. The spring's compression factor has been shown to create problems. First, if the spring's compression factor is too much it can create difficulties in properly sealing and securing the end of the light resulting in a poor seal or cross-threaded connection. Second, utilizing threaded connections to secure an end or access lid of the light, over time, can reduce the spring's compression, which can result in the loss of the necessary electrical connection between the battery and the light bulb.

Accordingly, there has been a need for a new device and method for releasably securing and sealing an end or access lid to a light which addresses the aforementioned shortcomings and other shortcomings associated with lights, lights, more specifically but not by way of limitation, underwater lights.

SUMMARY

In one aspect, the present invention provides a light, more specifically but not by way of limitation an underwater light, that includes at least a first portion that is designed to be releasably sealed and secured to a second portion. The first portion having integrated therein a first field emission structure and the second portion having a second field emission structure, where the first field emission structure interacts with the second field emission structure, wherein each of the first and second field emission structures comprise an array of field emission sources each having positions and polarities relating to a desired spatial force function that corresponds to a relative alignment of the first and second field emission structures within a field domain. The releasable portion of the light can be releasably secured and sealed to the second portion of the light when the first and second field emission structures are adjacent one another and have a certain alignment with respect to one another. The releasable portion of the light can be released from the second portion when the first and second field emission structures are manipulated out of alignment with respect to one another. This is possible because each field emission source of each array of field emission sources has a corresponding field emission amplitude and vector direction determined in accordance with the desired spatial force function, wherein a separation distance between the first and second field emission structures and the relative alignment of the first and second field emission structures creates a spatial force in accordance the desired spatial force function. And, the field domain corresponds to first field emissions from the array of first field emission sources of the first field emission structure interacting with second field emissions from the array of second field emission sources of the second field emission structure.

In another aspect, the present invention provides a method for using an underwater light that includes at least the steps of: (a) releasing an end or lid of the light from the body of the light where the end or lid has integrally secured thereon a first field emission structure and wherein the body of the light has integrally mounted thereon a corresponding second field emission structure, the end or lid of the light is released by rotating the first field emission structure and the second field emission structure with respect to one another; and (b) accessing at least a portion of an internal cavity of the light for the purpose maintenance or replacement of a part disposed therein and (c) securing and sealing the end or lid of the light to the body, such that the first field emission structure integrally mounted on the end or lid is adjacent to a second field emission structure integrally mounted on the body of the light, where the end or lid is releasably secured to the body when the first and second field emission structures are located adjacent one another and have a certain alignment with respect to one another, and where each of the first and second field emission structures comprise an array of field emission sources each having positions and polarities relating to a desired spatial force function that corresponds to a relative alignment of the first and second field emission structures within a field domain.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 1-9 are various diagrams used to help explain different concepts about correlated magnetic technology, which can be utilized in an embodiment of the present invention;

FIGS. 15A-15I are several diagrams that illustrate a portion of the light which are used to show how an exemplary first magnetic field emission structure integrally secured to an end or lid of the light and its mirror image second magnetic field emission structure (integrally secured to the body of the light) can be aligned or misaligned relative to each other to enable one to secure or remove the end or lid from the body of the light in accordance with an embodiment of the present invention.

DETAILED DESCRIPTION

The present invention includes a light which utilizes correlated magnetic technology in place of traditional mechanical fasteners to releasably secure and seal an end or an access lid to allow a user to access at least a portion of the interior of the light to perform maintenance such as but not limited to replacing a light bulb or changing a power source. It is further contemplated within the scope of the present invention that the light also utilizes correlated magnetic technology to be releasably secured to a variety of objects such as but not limited to a scuba dive harness, scuba belt, a storage wall, or rack. The light utilizes correlated magnetic technology and is a significant improvement over a conventional light which employ threads, clamps, rings or other known fastening devices to enable the connection and sealing of an end or lid to the body of the light or enables a light to be releasably secured to an object (e.g., scuba dive harness, storage rack). This significant improvement over the state-of-art is attributable, in part, to the use of an emerging, revolutionary technology that is called correlated magnetics.

Correlated magnetics was first fully described and enabled in the co-assigned U.S. patent application Ser. No. 12/123, 718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358, 423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476, 952 tiled on Jun. 2, 2009 and entitled "A Field Emission System and Method". The contents of this document are hereby incorporated herein by reference. Correlated inductance technology, which is related to correlated magnetics technology, is described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic light of the present invention.

Correlated Magnetics Technology

This section is provided to introduce the reader to correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
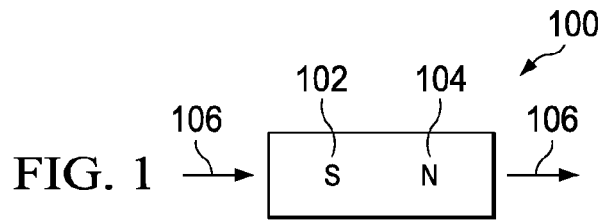

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
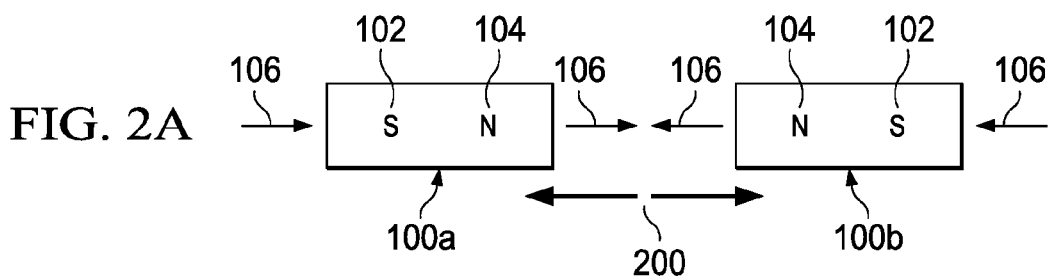
Figure 2B:
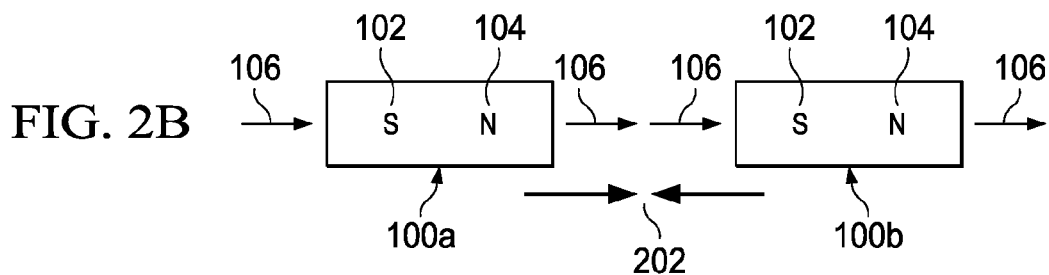
Figure 2C:
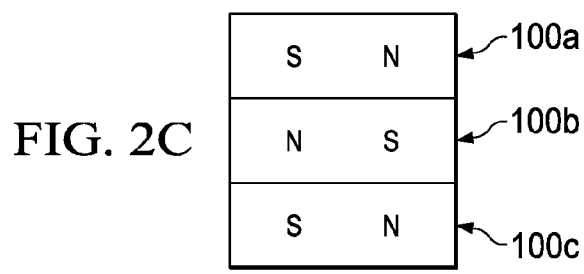

Referring to FIG. 2A, there is a diagram that depicts two magnets 100*a* and 100*b* aligned such that their polarities are opposite in direction resulting in a repelling spatial force 200 which causes the two magnets 100*a* and 100*b* to repel each other. In contrast, FIG. 2B is a diagram that depicts two magnets 100*a* and 100*b* aligned such that their polarities are in the same direction resulting in an attracting spatial force 202 which causes the two magnets 100*a* and 100*b* to attract each other. In FIG. 2B, the magnets 100*a* and 100*b* are shown as being aligned with one another but they can also be partially aligned with one another where they could still "stick"

to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Referring to FIG. 3A, there are diagrams used to explain how a Barker length 7 code 300 can be used to determine polarities and positions of magnets 302a, 302b ... 302g making up a first magnetic field emission structure 304. Each magnet 302a, 302b ... 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b ... 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b ... 302g and 308a, 308b ... 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the minor image (pattern) of the bottom face of the first magnetic field emission structure 304.

Figure 4B:
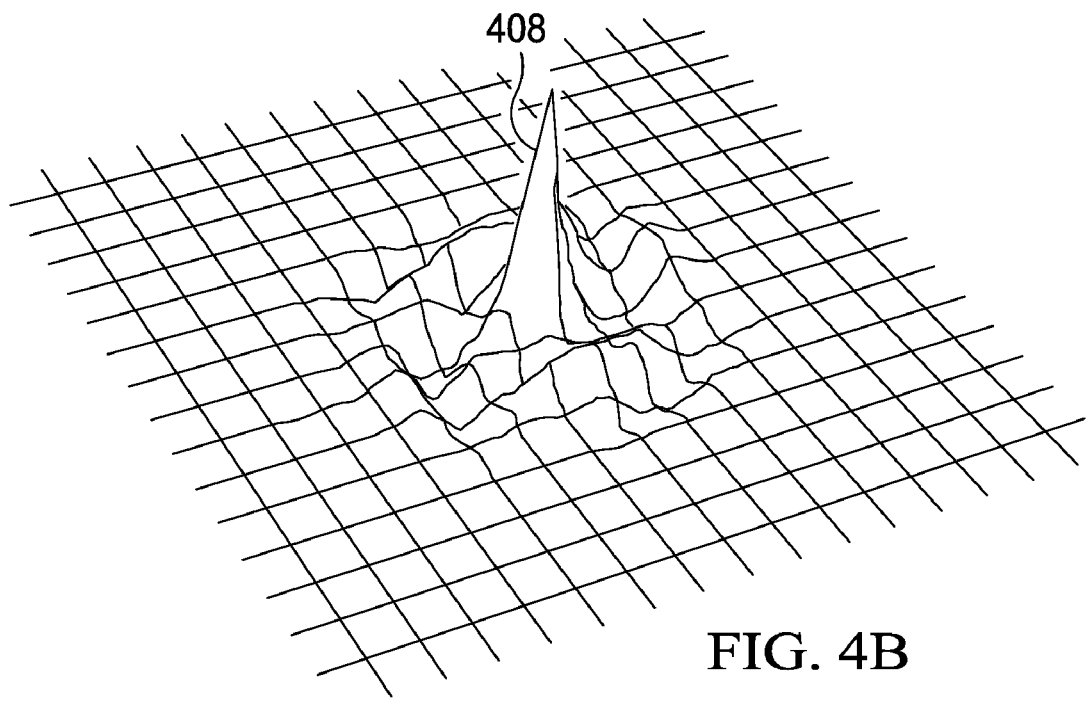
Figure 4C:
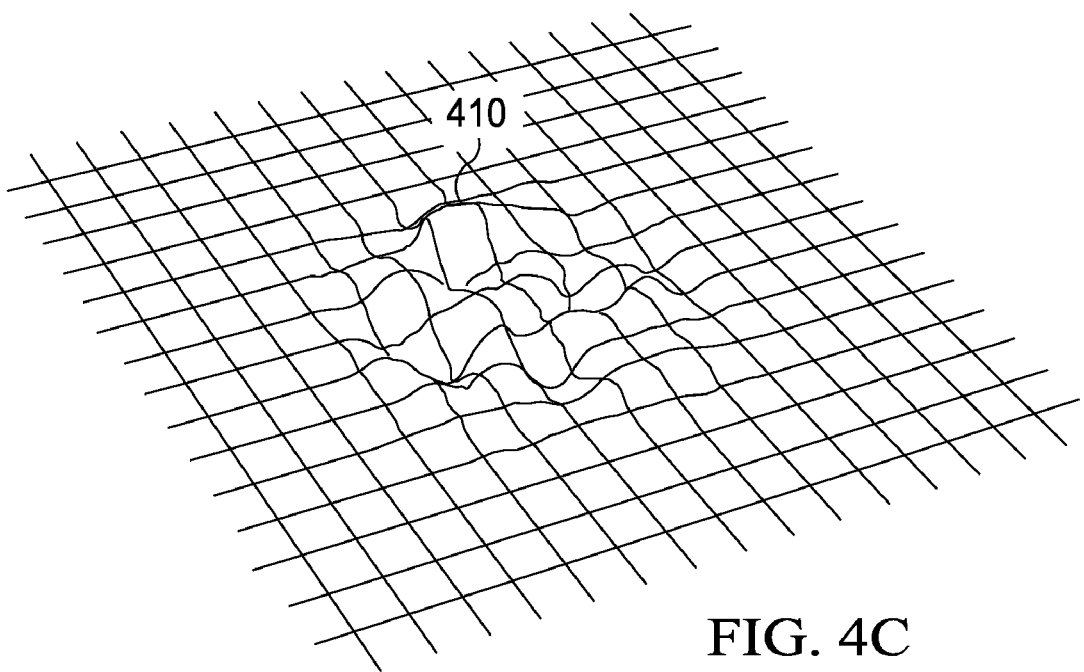

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its minor magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
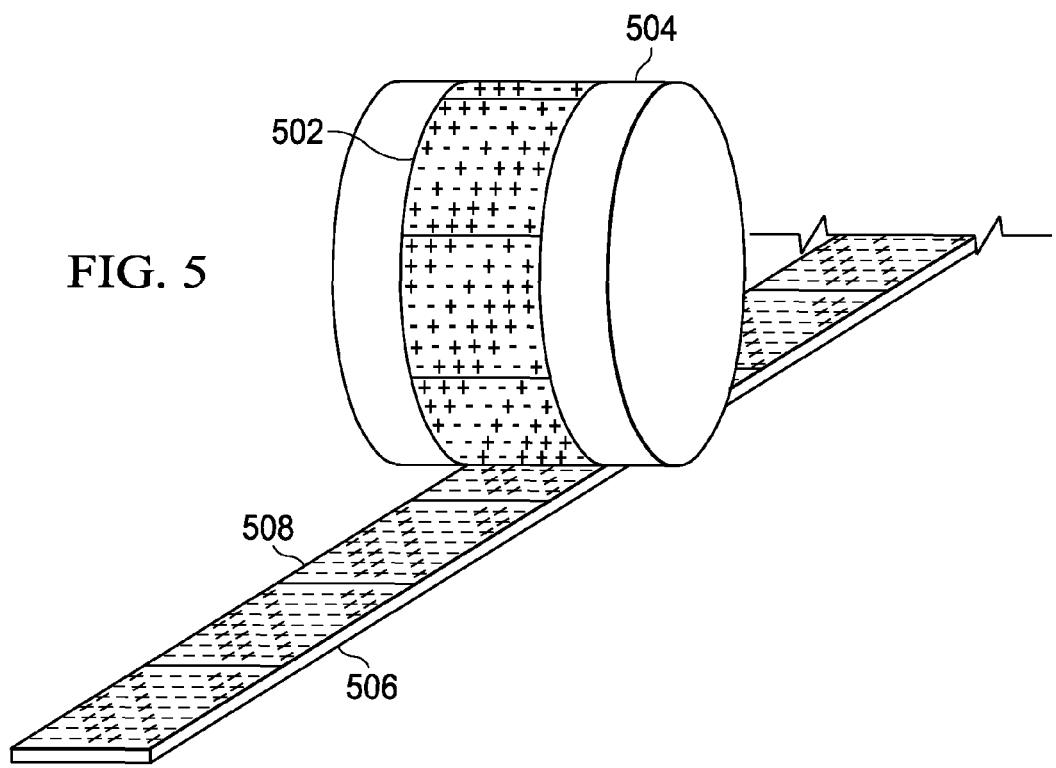

Referring to FIG. 5, there is a diagram depicting a correlating magnet structure 502 being wrapped back on itself on a cylinder 504 (or disc 504, wheel 504) and a conveyor belt/tracked structure 506 having located thereon a mirror image correlating magnet structure 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating structures to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
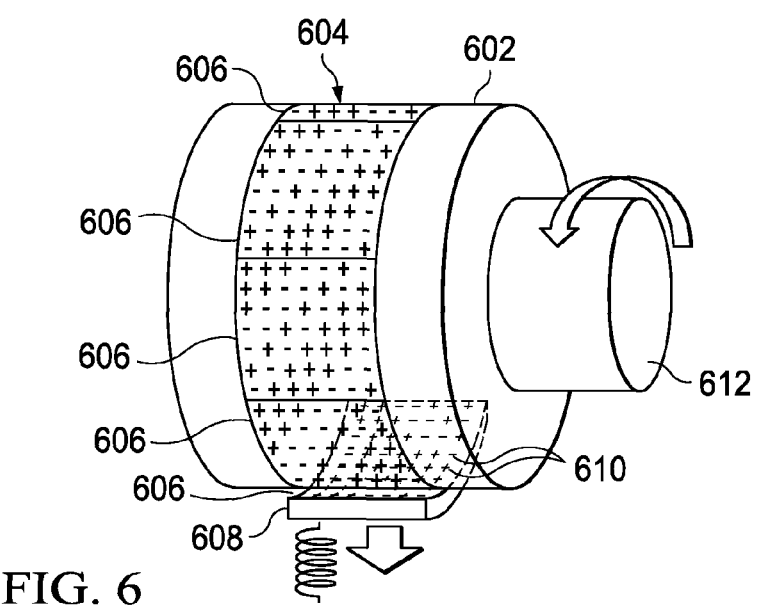

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored axle pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the an will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
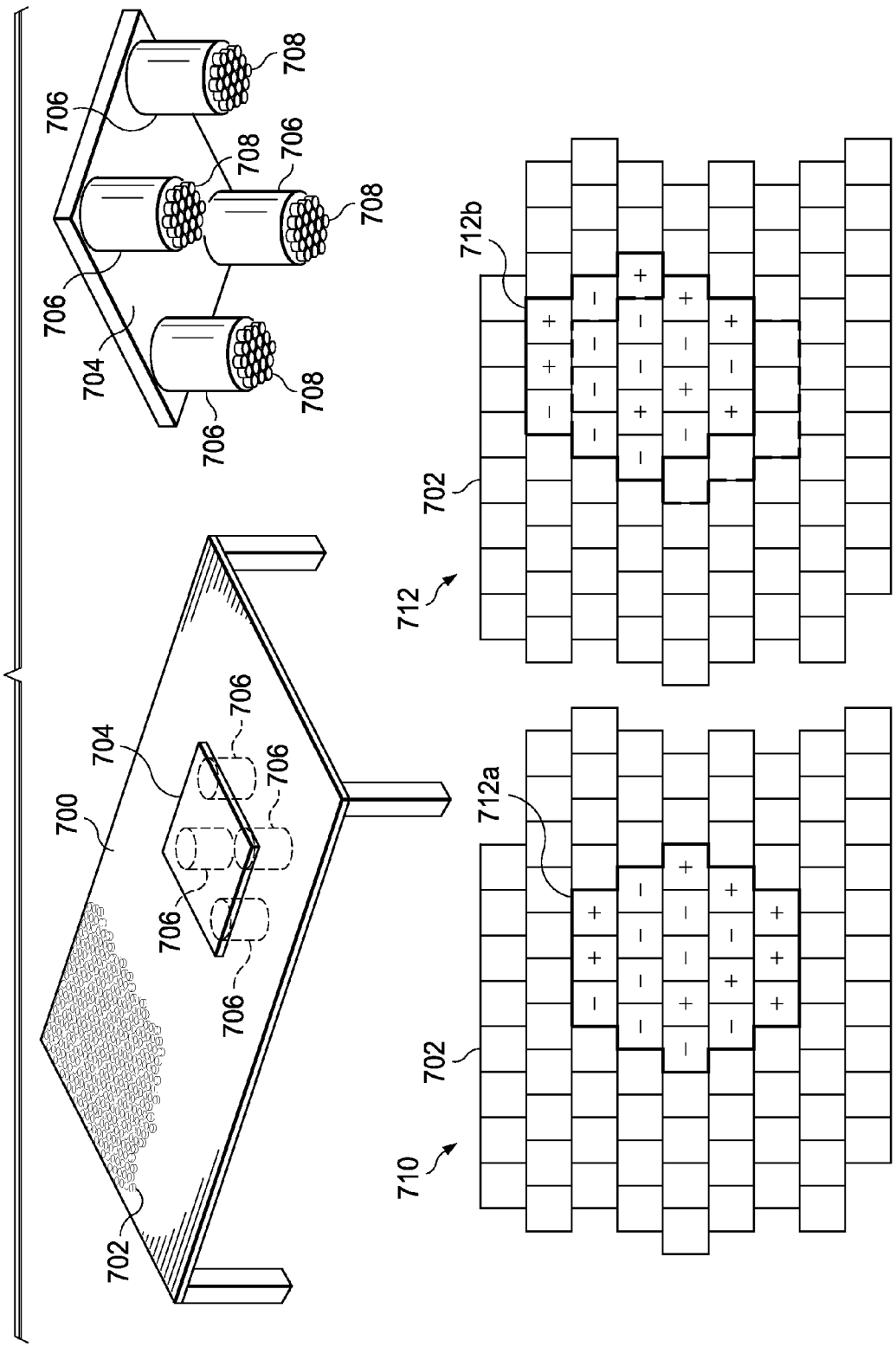

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
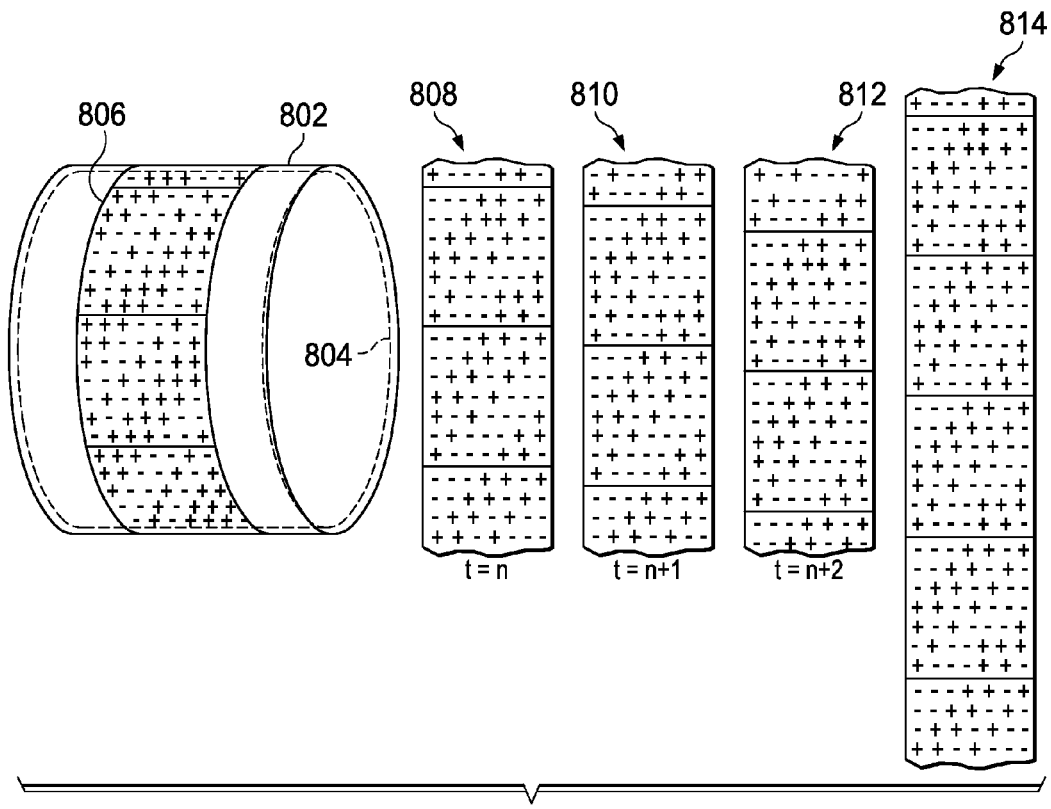

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving minor image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n−1, and t=n−2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
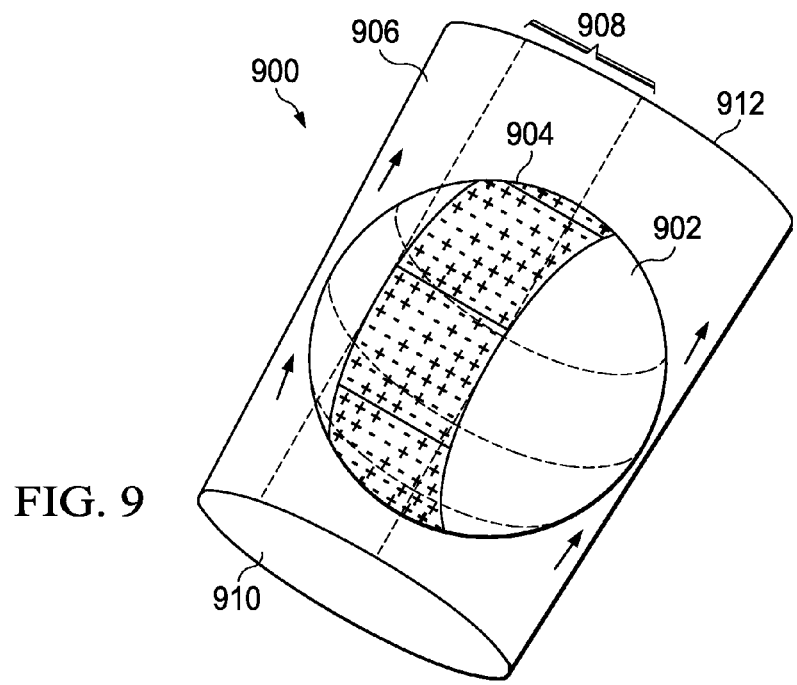

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Light

Referring to FIGS. 10A-14B, there are disclosed exemplary lights 1000, 1200, 1300 and 1400 and methods for using the four exemplary lights in accordance with the present invention. Although the exemplary embodiments are described as being configured as underwater or scuba lights, it should be understood that a similar correlated magnetic light can be configured for a wide-variety of applications including, for example, flashlights, studio lights, stage lights, headlight and taillight assemblies, swimming pool lights, outdoor lighting, flood lights, and any type of light that is manufactured to have an interior portion sealed from the surrounding environment, or manufactured with a removable portion for providing access to an interior portion of the light. Accordingly, the embodiments of correlated magnetic lights disclosed herein should not be construed in a limited manner.

Figure 10A:
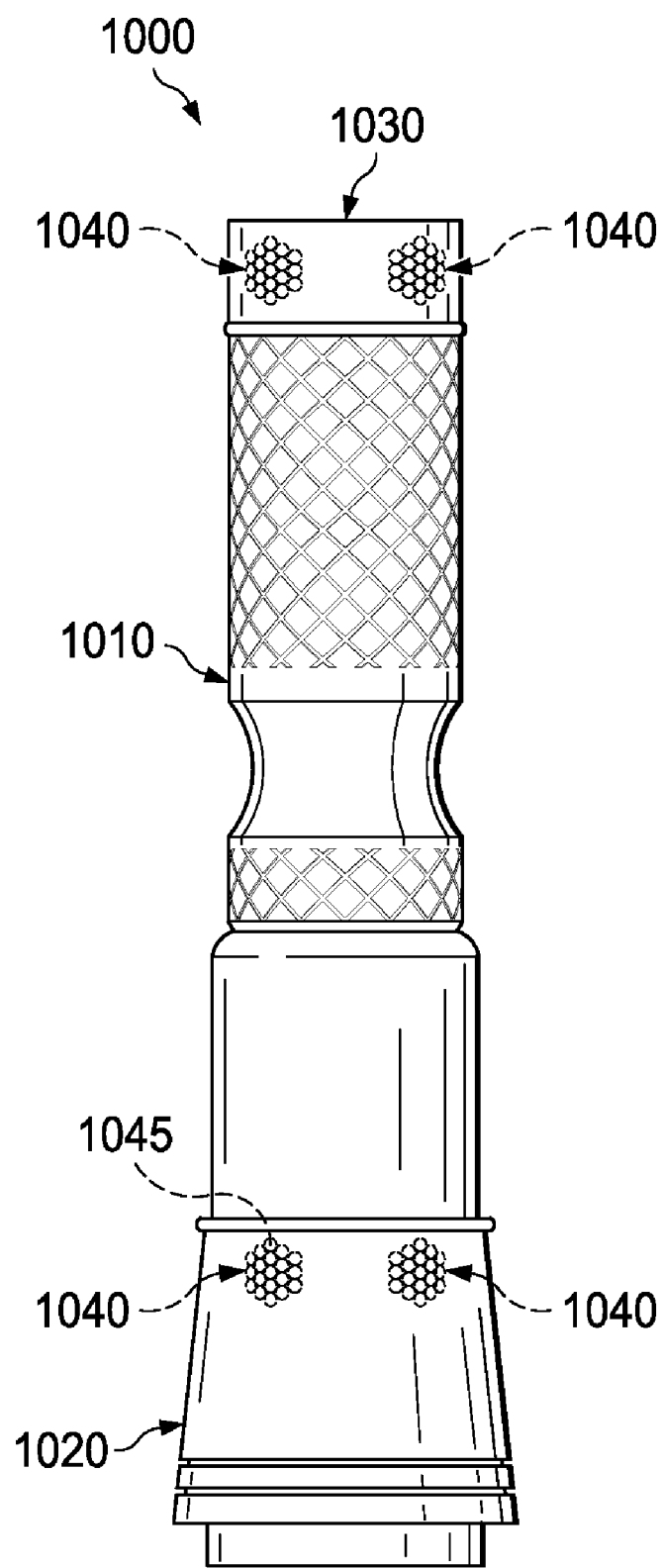
FIG. 10A is a side view of an embodiment of the present invention.
Figure 10B:
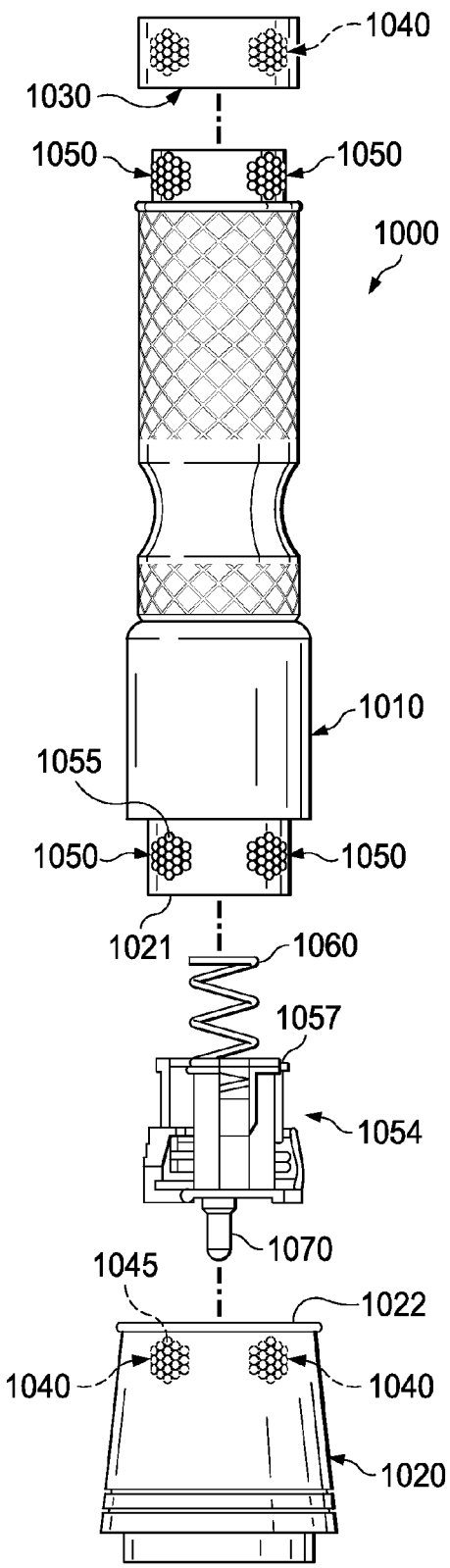
FIG. 10B is side exploded view of an embodiment of the present invention as similarly shown in FIG. 10A.

Referring in particular to FIGS. 10A and 10B is illustrated a light 1000. The light 1000 is a conventional style flashlight that comprises a body 1010 that is generally cylindrical in shape and is constructed from a suitable durable material. The body 1010 further includes a lens cap 1020 and a battery cap 1030. When the light 1000 is assembled, the lens cap 1020 houses at least a portion of the light assembly 1054 and generally has a lens covering the end, while the battery cap 1030 provides quick access to the interior of the body 1010 for the insertion and removal of batteries from the light 1000.

The lens cap 1020 and the battery cap 1030 are configured to be releasably secured and sealed to the body 1010 to allow a user to access at least a portion of the interior of the body 1010. The lens cap 1020 and the battery cap 1030 are configured to overlap a corresponding adjacent portion of the body 1010 when assembled. The light 1000 is illustrated having the lens cap 1020 and the battery cap 1030 that are configured to be releasably secured to the body 1010, however, it is contemplated to be within the scope of the present invention that the light 1000 could be made to have only one end that is configured to be releasably secured and sealed to the body 1010.

Additionally, the light 1000 could have integrated thereon an access lid releasably secured to facilitate access to at least a portion of the interior of the light 1000 in place of and/or in conjunction with a releasably secured end. Those skilled in the art should also recognize that the body 1010 while illustrated herein as being generally cylindrical in shape could be manufactured in a variety of different shapes and sizes.

Integrally mounted around the perimeter of the lens cap 1020 and the battery cap 1030 are first magnetic field emission structures 1040. Integrally mounted around the perimeter of the body 1010 at either end are second magnetic field emission structures 1050. Each of the first magnetic field emission structures 1040 include an array of field emission sources 1045 and each of the second magnetic field emission structures 1050 include an array of field emission sources 1055. The first and second magnetic field emissions structures 1040 and 1050 both positions and polarities in accordance with the same code but are a mirror image of one another (see FIGS. 4A-4C AND 15A-15I), such that when first and second magnetic field emission structures 1040 and 1050 are located in certain proximity and have a certain alignment with respect to one another, the securing and sealing of the lens cap 1020 to the body 1010 and the battery cap 1030 to the body 1010 is accomplished. Depending on materials used, manufacturing reasons, or other reasons, first and second magnetic field emission structures 1040 and 1050 may be integrally mounted on an inside surface, an outside surface, and/or within a material(s) used to produce the light. Therefore, such structures may not actually be visible to the user of the light as illustrated herein.

The removal of the lens cap 1020 or the battery cap 1030 from the body 1010 is accomplished by separating the attached first and second magnetic field emission structures 1040 and 1050. In particular, the lens cap 1020 and the battery cap 1030 can be released from the body 1010 when the lens cap 1020 and the battery cap 1030 are rotated in relation to body 1010 which will in turn, misalign the corresponding first and second magnetic field emission structures 1040 and 1050. If desired, a release mechanism 1620 can be used to turn the first magnetic field emission structure 1040 with respect to the second magnetic field emission structure 1050 so as to release the lens cap 1020 and the battery cap 1030 from the body 1010 (see FIGS. 15A-15I and 16A-16C). Alternatively, the first and second magnetic field structures 1040 and 1050 can be designed such that the lens cap 1020 and the battery cap 1030 can be detached from the body 1010 by pulling them apart without rotation. However, it is preferable that a torque force produced when rotating the lens cap 1020 and the battery cap 1030 be required to overcome the attractive force of the attached magnetic field structures, where the attractive force is sufficiently strong to make it difficult to merely pull the lens cap 1020 and the battery cap 1030 to remove them. Basically, use of cylindrical shapes allows for their rotation thereby allowing for stronger sealing forces due to the ability to take advantage of the release characteristics described in relation to FIGS. 15A-15I. But, cylindrical shapes and/or rotation are not required to practice the invention.

The attachment and de-attachment of the first and second magnetic field emission structures 1040 and 1050 is possible because of the array of field emission sources 1045 and 1055 respectively. Field emission sources 1045 and 1055 each have positions and polarities relating to a desired spatial force function that corresponds to a relative alignment of the first and second magnetic field emission structures 1040 and 1050 within a filed domain (see discussion about correlated magnet technology).

Generally, the magnetic field emission structures 1040, 1050 could be coded utilizing the field emission sources 1045 and 1055 such that they would only attach when a user places the lens cap 1020 and the battery cap 1030 in desired positions. Such Coding of the magnetic field emission structures 1040 and 1050 would therefore ensure the proper assembly of light 1000.

It is contemplated to be within the scope of the present invention that the number and size of the first and second magnetic field emission structures 1040 and 1050 could vary depending on the intended use and design of light 1000

Still referring to FIGS. 10A and 10B, the light 1000 further includes a light assembly 1054 comprising a light source 1070 and a spring 1060. Subsequent the securing of the first end 1020 to the body 1010, the spring compresses and functions to provide the operable electrical connection between a power source that is disposed within the body 1010 and the light source 1070. It is further contemplated within the scope of the present invention that a spring 1060 could be replaced with any method suitable to provide an operable electrical connection between a power source disposed within the body 1010 and the light source 1070. More specifically but not by way of limitation, the light 1000 could be manufactured such that the compression force created when utilizing the corresponding first and second magnetic field emission structures 1040 and 1050 would result in the operable electrical connection between the power source and the light source 1070. Those skilled in the art should recognize that the light assembly 1054 could be manufactured from numerous different materials and formed in numerous different shapes to accomplish this objective. It is further contemplated within the scope of the present invention that the light source 1070 could be manufactured from numerous suitable known types of materials. More specifically but not by way of limitation, the light source 1070 could be an LED light or a halogen, xenon, fluorescent or an incandescent bulb.

Although this and the other embodiments are disclosed herein as having a single light source, it is contemplated that variable light sources, multiple light sources and different types of light sources could also be utilized. For example, the light source could include 3 LED lights, where the lights could be operated all together or in variable combinations to adjust the amount of light that is produced. It is further contemplated that the magnetic field emission structures could be integrated with the electrical operation of the light source, such that the particular mating or combination of the magnetic field emission structures would operate and control the light source.

Figure 11:
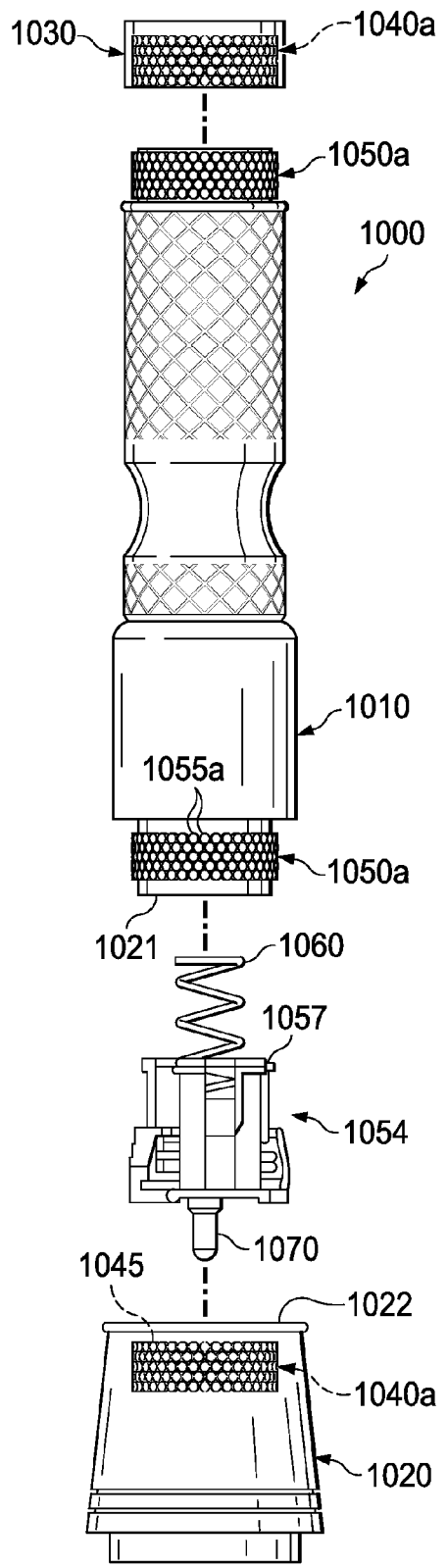
FIG. 11 is a side exploded view of an alternative embodiment of the present invention as similarly shown in FIGS. 10A and 10B.

Referring now to FIG. 11, there is illustrated an alternative embodiment of light 1000 as similarly illustrated in FIGS. 10A and 10B. It is noted that the elements of light 1000 illustrated in FIG. 11 that are the same as illustrated in FIGS. 10A and 10B are depicted with identical references numerals and are as described above. As depicted in FIG. 11, two-dimensional first magnetic field emission structures 1040a are integrally mounted around the inside perimeter of the lens cap 1020 and around the inside perimeter of the battery cap 1030. Integrally mounted around the outside perimeter of the body 1010 at either end are the second magnetic field emission structures 1050a, which are also two-dimensional structures. Each of the first magnetic field emission structures 1040a include an array of field emission sources 1045 and each of the second magnetic field emission structures 1050a include an array of field emission sources 1055 that are complementary to the array of field emission sources 1045 of the first magnetic field emission structure 1040a. If desired, the first magnetic field structures 1040a could instead be mounted on the outside perimeter of the lens cap 1020 and around the outside perimeter of the battery cap 1030 and the second magnetic field emission structures 1050a could be mounted on the inside perimeter of the body 1010 at either end, or some other combination could be employed. Moreover, one dimensional magnetic field emission structures could be used and/or structures could be used that do not extend fully around a given perimeter (e.g., multiple structures could be used that are spaced about a given perimeter). Generally, one skilled in the art will recognize that many different combinations and configurations of first and magnetic field structures could be used to achieve desired attachment and release characteristics.

In the preferred embodiment depicted in FIG. 11, each of the first magnetic field emission structures 1040a and corresponding second field emission structures 1050a can both be coded in one singular encoded structure or in repeated coded sections, with first emission structures 1040*a* and second field emission structures 1050*a* being encoded with mirror images of one another. The coding is such that when the first and second magnetic field emission structures 1040*a* and 1050*a* are located in certain proximity and have a certain alignment with respect to one another, the securing and sealing of the lens cap 1020 to the body 1010 and the battery cap 1030 to the body 1010 is accomplished. Thus, if N repeated coded sections are employed than the securing and sealing of the lens cap 1020 to the body 1010 and the battery cap 1030 to the body 1010 can be accomplished at any of N different alignments. If N were 12, then securing and sealing of the lens cap 1020 or battery cap 1030 could correspond to twelve different 30 degree rotations around the body 1010 (much like a clock).

Subsequent the coupling of the lens cap 1020 to the body 1010 and the coupling of the battery cap 1030 to the body 1010, each can be rotated with respect to the body 1010 to a position (or one of N positions) such that a peak spatial attraction force exists between the first magnetic field emission structure 1040*a* and the second magnetic field emission structure 1050*a* thereby securing each of the lens cap 1020 and the battery cap 1030 to the body 1010.

Still referring to FIG. 11, the removal of the lens cap 1020 or the battery cap 1030 from the body 1010 is accomplished by rotating the lens cap 1020 with respect to the body 1010 or by rotating the battery cap 1030 with respect to the body 1010. The rotation misaligns the corresponding first and second magnetic field emission structures 1040*a* and 1050*a* removing each from a position of peak spatial attraction force, thereby permitting the removal each of the lens cap 1020 and the battery cap 1030 from the body 1010.

Referring now to FIGS. 10A, 10B and 11, it is contemplated that the light 1000 could be constructed such that an environmental seal exists between the lens cap 1020 and the body 1010, as well as between the battery cap 1030 and the body 1010, and thus isolating the interior of the light 1000 from its external environment. More specifically but not by way of limitation, the light 1000 could include an o-ring or gasket to provide a seal substantially resistant to external environments such as but not limited to water, acidic fog, smoke and numerous other environments that at least partially contain materials and matter that could be damaging to the internal components of the light 1000.

Figure 12A:
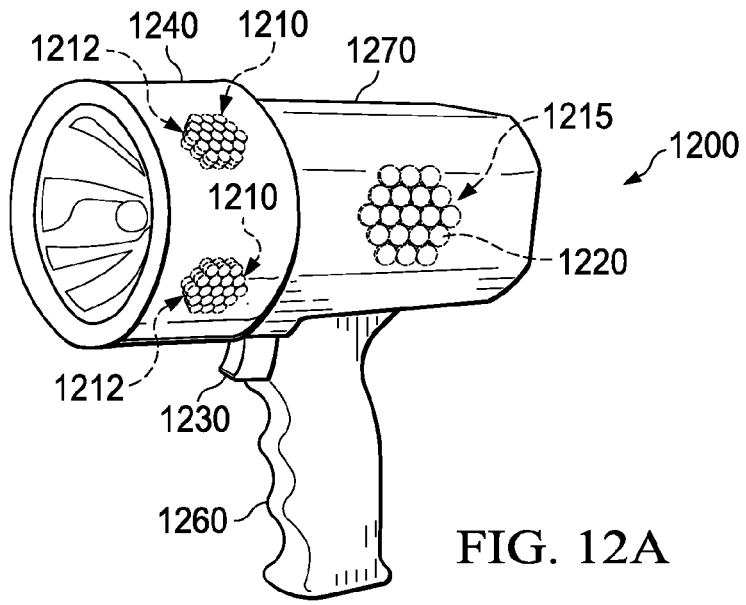
FIGS. 12A and 12B are perspective views of other embodiments of the present invention.

Referring now to FIG. 12A, an alternative embodiment of the present invention is shown that represents another configuration of an exemplary underwater light 1200 utilized by divers. The underwater light 1200 has one end 1240 that is releasably secured to the body 1270 and provides a watertight seal there between. The end 1240 overlaps the adjacent portion of the body 1270 when coupled thereto. Extending in a generally downward direction from the body 1270 and integrally mounted thereto is a handle 1260. Mounted on the handle 1260 proximate the body 1270 is a switch 1230 for activating and deactivating the light 1200.

The light 1200 includes first magnetic field emission structures 1210 integrally mounted about the perimeter of the end 1240 and corresponding second magnetic field emissions structures 1212 integrally mounted to the body 1270 as similarly described in reference to the light 1000 of FIGS. 10A, 10B and 11. As with the light 1000, the first magnetic field emission structures 1210 and the corresponding second magnetic field emissions structures 1212 facilitate the securing of the end 1240 to the body 1270. The two corresponding magnetic field emission structures each include an array of field emission sources such as field emission sources 1220 with each having positions and polarities relating to a desired spatial force function that corresponds to a relative alignment of the first magnetic field emission structure with the corresponding second magnetic field emission structure. The first and second magnetic field emissions structures both have the same code but are a mirror image of one another, such that when corresponding first magnetic field emission structures 1210 are located in certain proximity to the second magnetic field emission structures 1212 and have a certain alignment with respect to one another, the securing and sealing of the end 1240 to the body 1270 is accomplished.

The removal of the end 1240 from the body 1270 is accomplished by separating the attached first and second magnetic field emission structures. In particular, the end 1240 can be released from the body 1270 when the end 1240 is rotated in relation to the body 1270 which will in turn, misalign corresponding first and second magnetic field emission structures 1210 and 1212. A release mechanism, such as release mechanism 1620, could also be used to turn the first magnetic field emission structure 1210 with respect to the second magnetic field emission structure 1212 so as to release the end 1210 from the body 1270 (see FIG. 16).

Generally, the first and second magnetic field emission structures could be coded utilizing the field emission sources such that a user can only place the end 1240 in select predetermined positions. Coding of the magnetic field emission structures in such a manner would therefore ensure the proper assembly of the light 1200.

It is contemplated to be within the scope of the present invention that the number, size, and type of the first magnetic field emission structures and second magnetic field emission structures could be varied depending on the intended use and design of the light 1200.

A third first magnetic field emission structure 1215 is integrally mounted on the body 1270. The third first magnetic field emission structure 1215 functions to secure the light 1200 to an external object having a corresponding magnetic field emission structure. More specifically but not by way of limitation, the third magnetic field emission structure 1215 could be coded to be releasably secured to an object containing a fourth corresponding magnetic field emission structure such as but not limited to a storage shelf or rack, a side of a boat or car, a belt or a scuba harness.

Figure 12B:
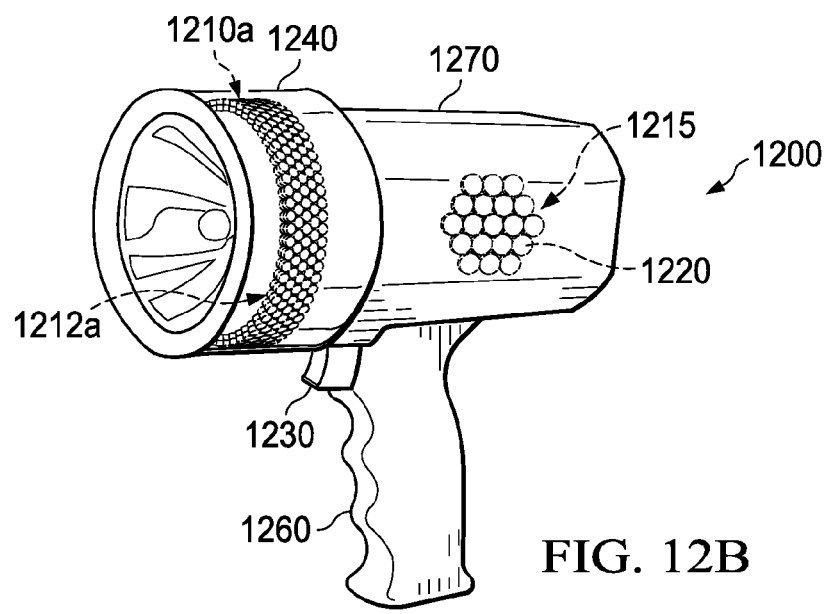

Referring now to FIG. 12B, there is illustrated an alternative embodiment of light 1200 as similarly illustrated in FIG. 12A. It is noted that the elements of the light 1200 illustrated in FIG. 12B that are the same as illustrated in FIG. 12A are depicted with identical references numerals and are as described above. As depicted in FIG. 12B, the light 1200 includes first magnetic field emission structures 1210*a* integrally mounted about the inside perimeter of end 1240 and corresponding second magnetic field emission structures 1212*a* integrally mounted about the outside perimeter of body 1270 (as similarly described in FIG. 11, elements 1040 and 1050). The first magnetic field emission structure 1210*a* and the corresponding second magnetic field emission structures 1212*a* each include an array of field emission sources. The first magnetic field emission structure 1210*a* and the corresponding second magnetic field emission structure 1212*a* can each be coded in one singular encoded structure or in coded sections, with the first field emission structure 1210*a* and the corresponding second magnetic field emission structure 1212*a* being encoded to be mirror images of one another. The coding is such that when the first magnetic field emission structure 1210*a* is located in certain proximity to the corresponding second magnetic field emission structure 1212*a* with certain alignment with respect to one another, the securing and sealing of the end 1240 to the body 1270 is accomplished. One skilled in the art will recognize that many different variations and combinations of complementary magnetic field emission structures can be employed to achieve desired attachment and release characteristics to include but not limited to those described in relation to FIG. 11.

Subsequent to the coupling of the end 1240 to the body 1270, the end 1240 can be rotated with respect to the body 1270 to a position such that a peak spatial attraction force exists between the first magnetic field emission structure 1210a and the second magnetic field emission structure 1212a, thereby securing the end 1240 to the body 1270.

Still referring to FIG. 12B, the removal of the end 1240 from the body 1270 is accomplished by rotating end 1240 with respect to body 1270. The rotation misaligns the corresponding first magnetic field emission structure 1210a from the second magnetic field emission structure 1212a removing each from a position of peak spatial attraction force, thereby permitting the removal of the end 1240 from the body 1270.

Figure 13A:
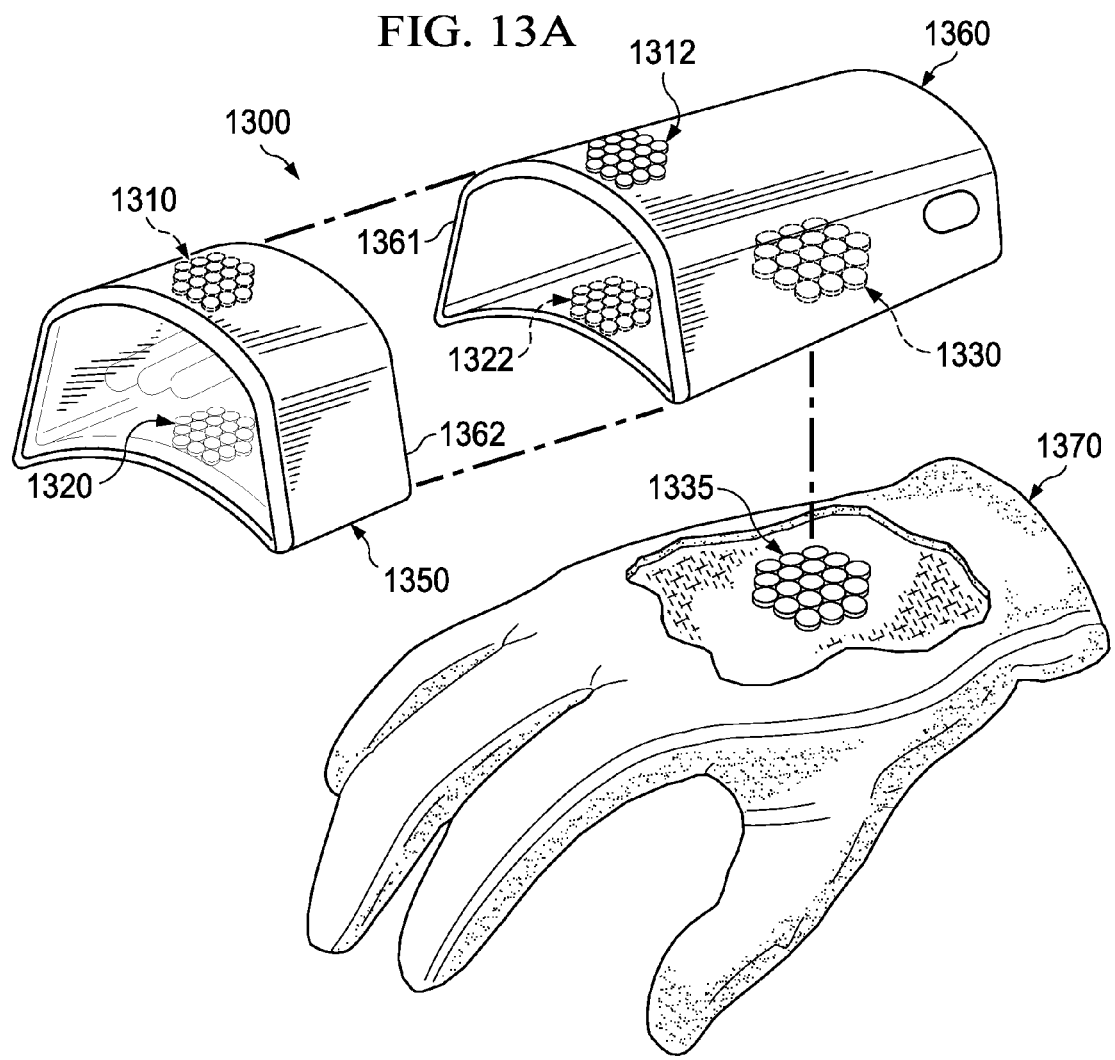
FIGS. 13A and 13B are perspective views of still other embodiments of the present invention.

Referring now to FIG. 13A, another embodiment of the present invention is shown that represents a configuration of an ecgonomically hand shaped light 1300 that is configured to mate with a glove 1370 worn by a diver. The light 1300 includes a body 1360 and a light element end 1350, with the body 1360 configured to receive therein a power source, such as batteries, to power the light contained in the light element end 1350 when assembled. The light element end 1350 includes first magnetic field emission structures 1310 and 1320 which can be aligned to be coupled with second magnetic field emission structures 1312 and 1322 when the light 1300 is assembled.

The body 1360 includes a third magnetic field emission structure 1330 which is configured to be aligned and releasably connected to a corresponding magnetic field emission structure 1335 that is integrated with the diver glove 1370 thereby enabling a user wearing the glove 1370 to releasably secure the light 1300 thereto. Those skilled in the art should recognize that the third magnetic field emission structure 1330 could be used to releasably secure the light 1300 to a variety of additional objects having a corresponding magnetic field emission structure such as but not limited to a wall, shelf, rack, boat, car, belt or harness. It is contemplated within the scope of the present invention that the exemplary embodiment depicted in FIG. 13A could utilize numerous different amounts of magnetic field emission structures to facilitate the securing of the light element end 1350 to the body 1360. Furthermore, it is contemplated within the scope of the present invention that the exemplary embodiment depicted in FIG. 13A could utilize correlated magnetic surfaces mounted on proximate edges 1361, 1362 to facilitate the securing of the end 1350 to the body 1360. It is also contemplated that the exemplary embodiment depicted in FIG. 13A could have a different shape to include at least a portion of the light element end 1350 and the body 1360 having a cylindrical shape thereby allowing for rotation.

In this embodiment, the light 1300 is constructed such that an environmental seal exists between end 1350 and body 1360 thus isolating the interior of light 1300 from the external environment. More specifically but not by way of limitation, light 1300 could include an o-ring or gasket to provide a seal substantially resistant to external environments such as but not limited to water, acidic fog, smoke and numerous other environments that at least partially contain materials and matter that could be damaging to the internal components of light 1300.

Figure 13B:
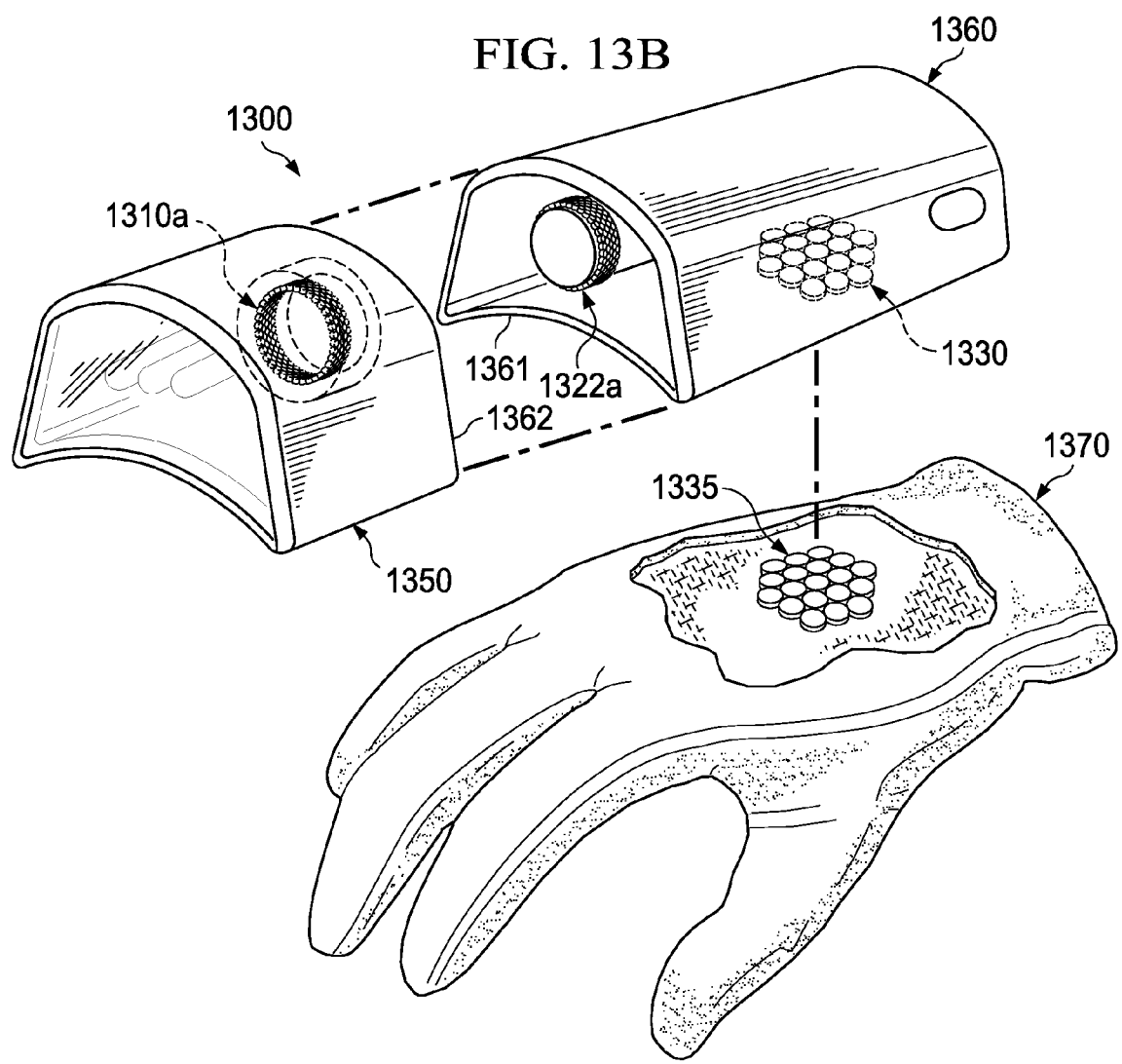

Referring now to FIG. 13B, there is illustrated an alternative embodiment of light 1300 as similarly illustrated in FIG. 13A. It is noted that the elements of light 1300 illustrated in FIG. 13B that are the same as illustrated in FIG. 13A are depicted with identical references numerals and are as described above. As depicted in FIG. 13B, the end 1350 of the light 1300 includes a generally cylindrical female connector portion with a first magnetic field emission structure 1310a integrally mounted about the inner perimeter therein. The body 1360 includes a corresponding male connector portion with a second magnetic field emission structure 1322a integrally mounted about the outer perimeter thereof. The first magnetic field emission structure 1310a and the second magnetic field emission structures 1322a each include an array of field emission sources as similarly described herein. Each of the first magnetic field emission structure 1310a and the corresponding second magnetic field emission structure 1322a can be coded in one singular encoded structure on in coded sections, with the first magnetic field emission structure 1310a and the second magnetic field emission structure 1322a encoded to be mirror images of one another. The coding is such that when the first magnetic field emission structure 1310a is located in certain proximity to the second magnetic field emission structure 1322a with certain alignment with respect to one another, the securing and sealing of the end 1350 to the body 1360 is accomplished.

With the proper coupling of the end 1350 to the body 1360, a peak spatial attraction force exists between the first magnetic field emission structure 1310a and the second magnetic field emission structure 1322a, thereby securing the end 1350 to the body 1360.

Still referring to FIG. 13B, the removal of the end 1350 from the body 1360 is accomplished by rotating the end 1350 with respect to the body 1360. The rotation misaligns the corresponding first magnetic field emission structure 1310a from the second magnetic field emission structure 1322a removing each from a position of peak spatial attraction force, thereby permitting the removal of the end 1350 from the body 1360.

Figure 14A:
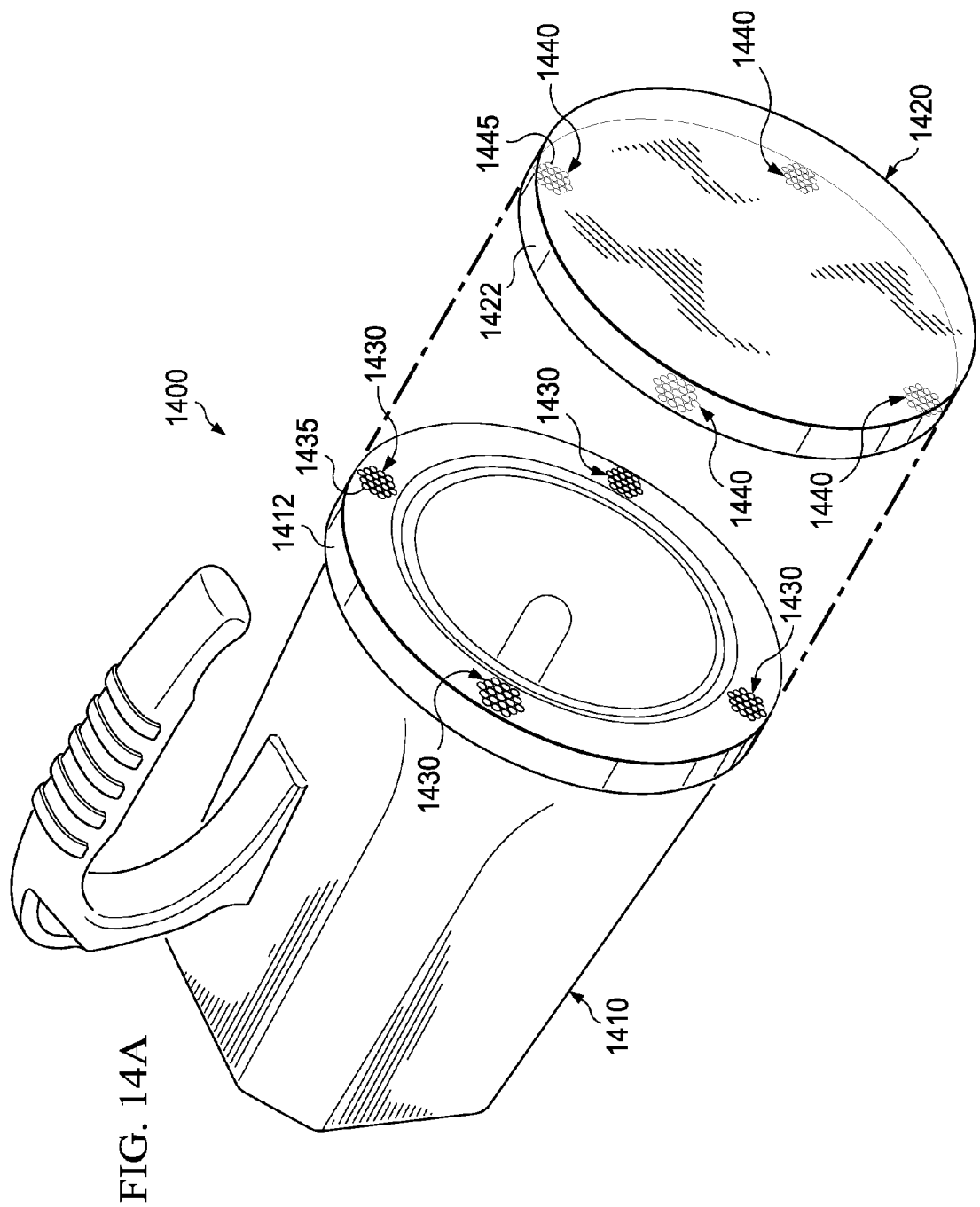
FIGS. 14A and 14B are partially exploded perspective views of other embodiments of the present invention.

Referring now to FIG. 14A, another embodiment of the present invention is shown that represents a configuration of an exemplary light 1400. The light 1400 includes a body 1410 and a lens cap 1420. The light 1400 is constructed such that the body 1410 and the lens cap 1420 include matching generally planar flange portions 1412 and 1422 respectively for securing the body 1410 and the lens cap 1420 together. The flange portion 1412 of the body 1410 includes multiple first magnetic field emission structures 1430 and the flange portion 1422 of the lens cap 1420 includes multiple second magnetic field emission structures 1440. The complementary magnetic field emission structures 1430 and 1440 are configured and aligned to releasably secure the lens cap 1420 to the body 1410 when the lens cap 1420 is placed proximate to the body 1410.

Each of the first magnetic field emission structures 1430 include an array of field emission sources 1435 and each of the second magnetic field emission structures 1440 include an array of field emission sources 1445. The first and second magnetic field emissions structures 1430 and 1440 both have source having polarities in accordance with the same code but are configured to be mirror images of one another (see FIGS. 4A-4C AND 15A-15I), such that when corresponding first magnetic filed emission structures 1430 are located in certain proximity to the second magnetic field emission structures 1440 and have a certain alignment with respect to one another, the securing and sealing of the lens cap 1420 to the body 1410 is accomplished.

The removal of the lens cap 1420 from the body 1410 is accomplished by separating the attached first and second magnetic field emission structures 1430 and 1440. In particular, the lens cap 1420 can be released from the body 1410 when the lens cap 1420 is rotated in relation to the body 1410 which will in turn, misalign the corresponding first and second magnetic field emission structures 1430 and 1440 (see FIGS. 15A-15I). If desired, a release mechanism 1620 can be used to turn the second magnetic field emission structure 1440 with respect to the first magnetic field emission structure 1430 so as to release the lens cap 1420 from the body 1410 (see FIGS. 16A-16C).

The attachment and de-attachment of the first and second magnetic field emission structures 1430 and 1440 is possible because of the array of field emission sources 1435 and 1445 respectively. The field emission sources 1435 and 1445 each have positions and polarities relating to a desired spatial force function that corresponds to a relative alignment of the first and second magnetic field emission structures 1430 and 1440 within a field domain (see discussion about correlated magnet technology).

Generally, the magnetic field emission structures 1430 and 1440 could each be coded utilizing the field emission sources 1435 and 1445 such that a user could only place and attach the lens cap 1420 in a predetermined position(s) thereby ensuring the proper assembly of the light 1400.

It is contemplated to be within the scope of the present invention that the number and size of the first and second magnetic field emission structures 1430 and 1440 could be varied depending upon the intended use and design of the light 1400.

Figure 14B:
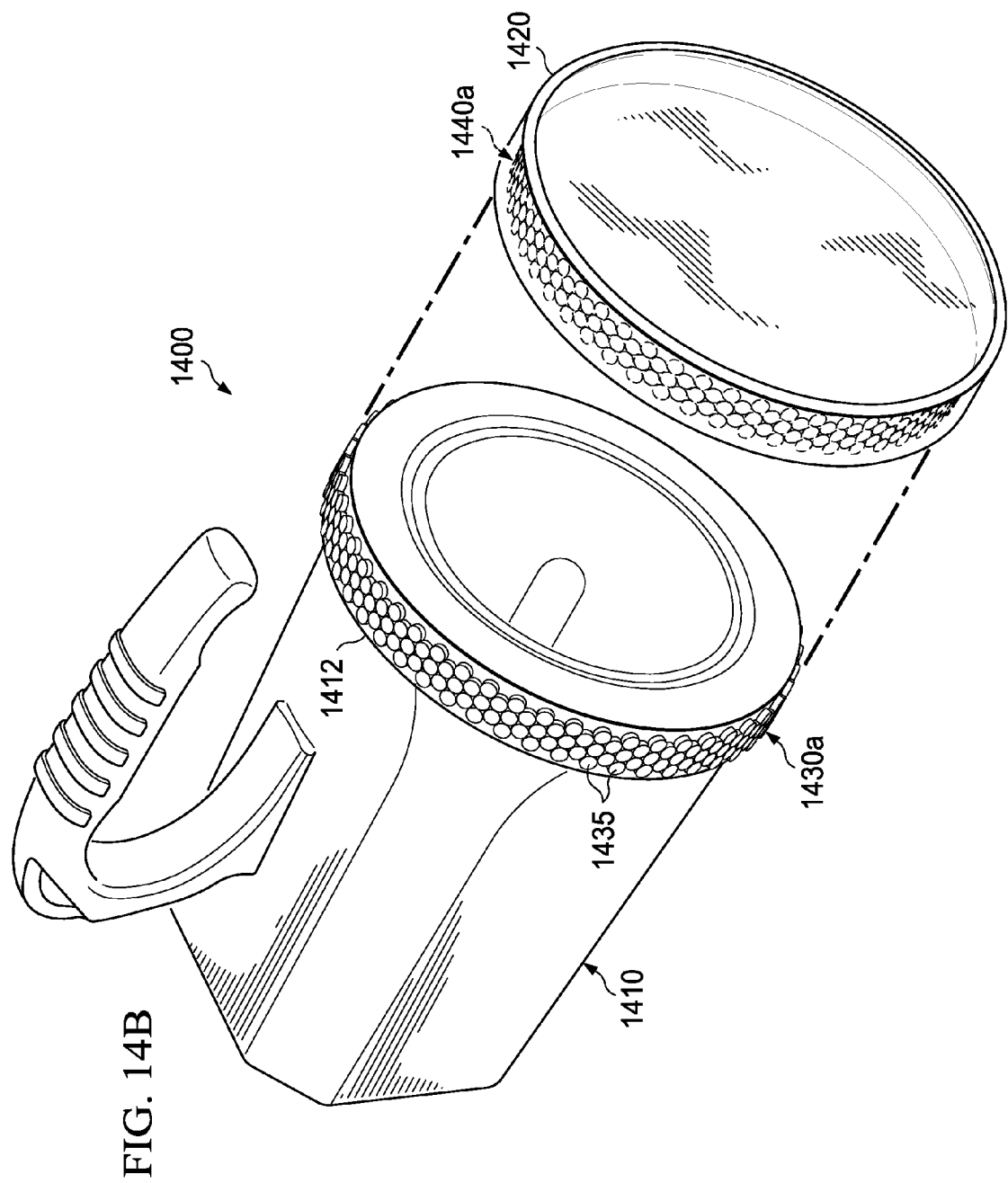

Referring now to FIG. 14B, there is illustrated an alternative embodiment of the light 1400 as similarly illustrated in FIG. 14A. It is noted that the elements of the light 1400 illustrated in FIG. 14B that are the same as illustrated in FIG. 14A are depicted with identical references numerals and are as described above. As depicted in FIG. 14B, the body 1410 of the light 1400 includes a flange portion 1412 with a first magnetic field emission structure 1430*a* integrally mounted about the outer perimeter thereon. The lens cap 1420 includes a generally circular lip with a second magnetic field emission structure 1440*a* integrally mounted about the inner perimeter thereof. The first magnetic field emission structure 1430*a* and the second magnetic field emission structure 1440*a* each include an array of field emission sources 1435 as similarly described herein. Each of the first magnetic field emission structure 1430*a* and the corresponding second magnetic field emission structure 1440*a* can be coded in one singular encoded structure or in coded sections, with the first magnetic field emission structure 1430*a* and the second magnetic field emission structure 1440*a* encoded to be mirror images of one another. The coding is such that when the first magnetic field emission structure 1430*a* is located in certain proximity to the second magnetic field emission structure 1440*a* with certain alignment with respect to one another, the securing and sealing of the end lens cap 1420 to the body 1410 is accomplished.

Subsequent to the coupling of the lens cap 1420 to the body 1410, the lens cap 1420 can be rotated with respect to the body 1410 to a position such that a peak spatial attraction force exists between the first magnetic field emission structure 1430*a* and the second magnetic field emission structure 1440*a*, thereby pulling the lens cap 1420 to the body 1410 with the second magnetic field emission structures 1440*a* positioned about and contiguous with the first magnetic field emission structure 1430*a*.

Still referring to FIG. 14B, the removal of the lens cap 1420 from the body 1410 is accomplished by rotating the lens cap 1420 with respect to the body 1410. The rotation misaligns the corresponding first magnetic field emission structure 1430*a* from the second magnetic field emission structure 1440*a* removing each from a position of peak spatial attraction force, thereby permitting the removal of the lens cap 1420 from the body 1410.

Referring to FIGS. 15A-15I, there is depicted an exemplary first magnetic field emission structures and exemplary second magnetic field emission structures embodied in the present invention as described herein above in the various embodiments. In particular, an exemplary first magnetic field emission structure 1506 (attached to the light embodiments of the present invention as illustrated in FIGS. 10A-14B) and its mirror image second magnetic field emission structure 1508 (attached to a portion of the light embodiments of the present invention as illustrated in FIGS. 10A-14B) and the resulting spatial forces produced in accordance with their various alignments as they are twisted relative to each other which enables one to secure or remove the ends 1020, 1030 (FIGS. 10A, 10B and 11), 1240 (FIGS. 12A and 12B), 1350 (FIGS. 13A and 13B), or lens cap 1420 (FIGS. 14A and 14) from the embodiments of the present invention.

Figure 15A:
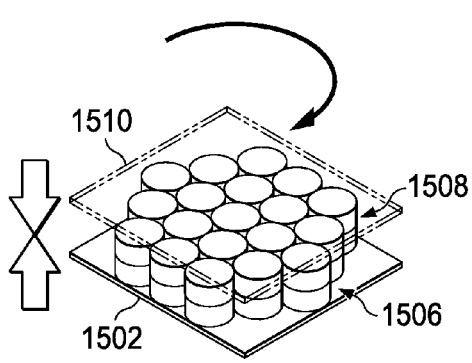

In FIG. 15A, the first magnetic field emission structure 1506 and the mirror image second magnetic field emission structure 1508 are aligned producing a peak spatial force.

Figure 15D:
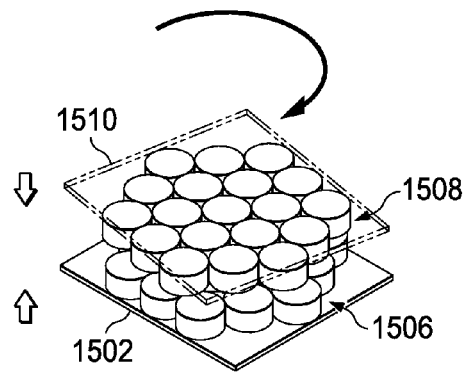
Figure 15B:
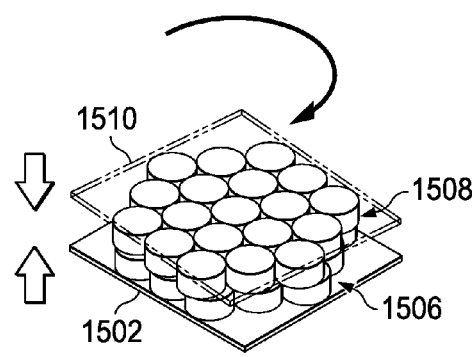
Figure 15C:
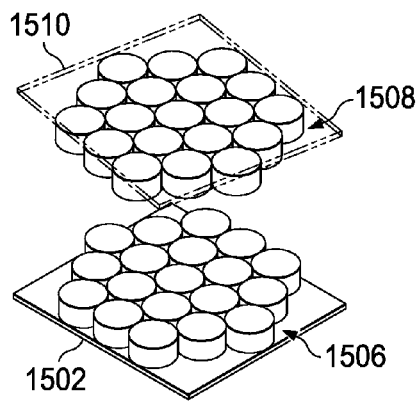
Figure 15C:
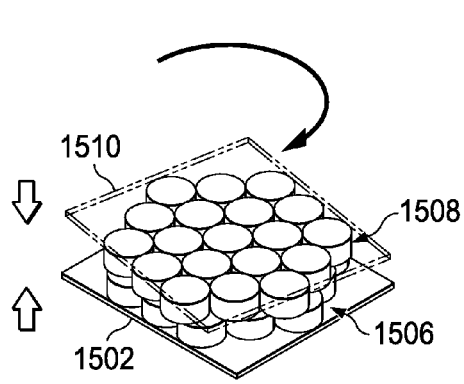
Figure 15F:
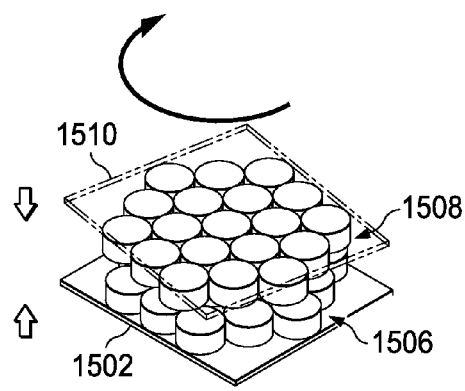
Figure 15G:
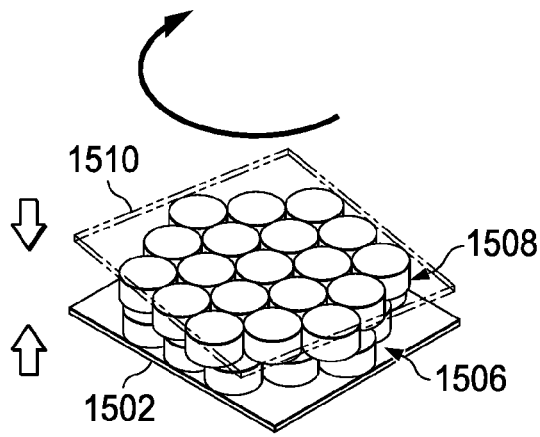
Figure 15H:
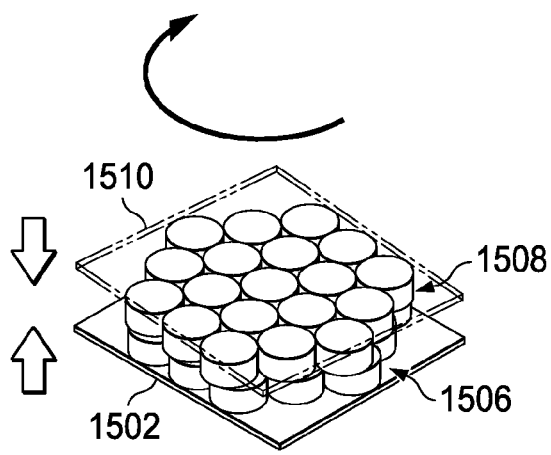
Figure 15I:
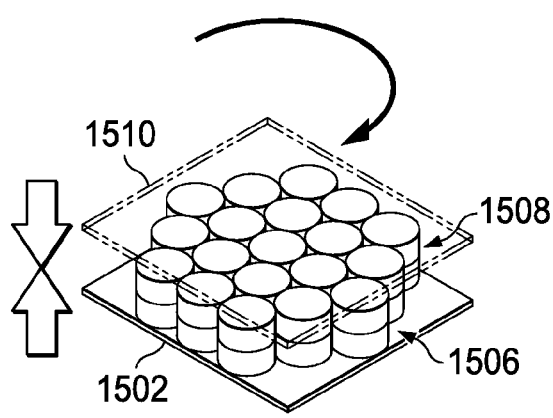

In FIG. 15B the mirror image second magnetic field emission structure 1508 is rotated clockwise slightly relative to the first magnetic field emission structure 1506 and the attractive force reduces significantly. In FIG. 15C, the mirror image second magnetic field emission structure 1508 is further rotated and the attractive force continues to decrease. In FIG. 15D, the mirror image second magnetic field emission structure 1508 is still further rotated until the attractive force becomes very small, such that the two magnetic field emission structures 1506 and 1508 are easily separated as shown in FIG. 15E. Given the two magnetic field emission structures 1506 and 1508 held somewhat apart as in FIG. 15E, the two magnetic field emission structures 1506 and 1508 can be moved closer and rotated towards alignment producing a small spatial force as in FIG. 15F. The spatial force increases as the two magnetic field emission structures 1506 and 1508 become more and more aligned in FIGS. 15G and 15H and a peak spatial force is achieved when aligned as in FIG. 15I. It should be noted that the direction of rotation was arbitrarily chosen and may be varied depending on the code employed. Additionally, the minor image second magnetic field emission structure 1508 is the mirror of the first magnetic field emission structure 1506 resulting in an attractive peak spatial force (see also FIGS. 3-4). This way of securing and removing the ends 1020, 1030 (FIGS. 10A, 10B and 11), 1240 (FIGS. 12A and 12B), 1350 (FIGS. 13A and 13B), or the lens cap 1420 (FIGS. 14A and 14B) from the embodiments of the present invention illustrated is a marked-improvement over the existing technology in which conventional threads or friction are utilized having the problems associated therewith as previously described herein.

The embodiments of the present invention illustrated herein can include a release mechanism 1620 that is used to turn one magnetic field emission structure relative to a second corresponding magnetic field emission structure so as to attach or release the ends such as with 1020, 1030 (FIGS. 10A, 10B and 11), 1240 (FIGS. 12A and 12B), 1350 (FIGS. 13A and 13B), or lens cap 1420 (FIGS. 14A and 14B) from the embodiments of the present invention illustrated herein. Alternatively, the embodiments of the present invention illustrated herein can include another type of release mechanism (not shown) that includes two field emission structures which are used to turn the second magnetic field emission structure relative to the first magnetic field emission structure so as to attach or release the ends 1020, 1030 (FIGS. 10A. 10B and 11), 1240 (FIGS. 12A and 12B), 1350 (FIGS. 13A and 13B), or lens cap 1420 (FIGS. 14A and 14B) from the exemplary embodiments of the present invention.

Figure 16A:
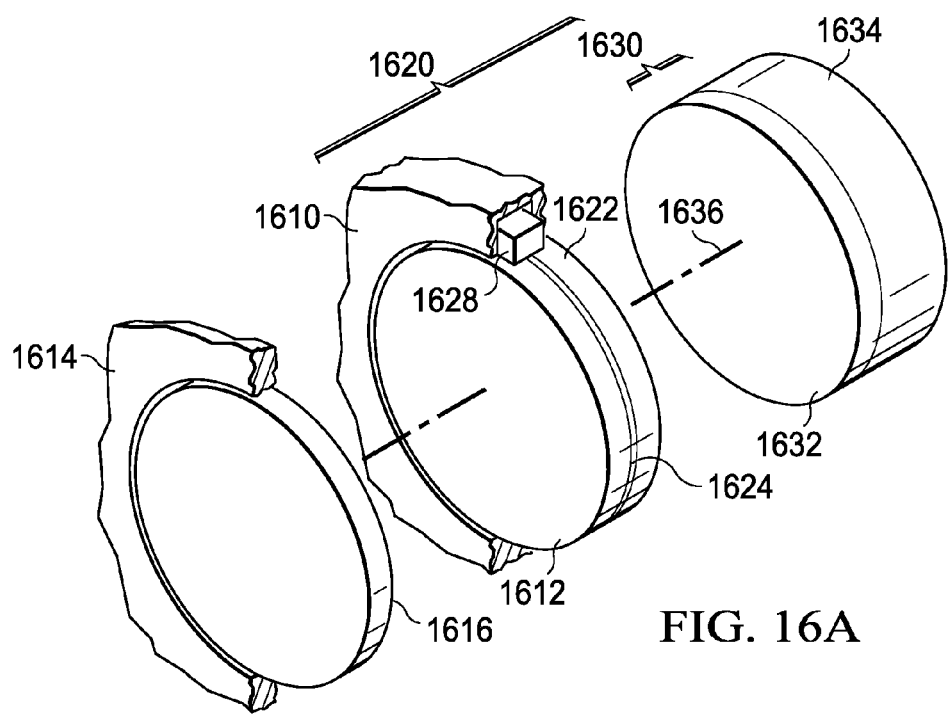
FIGS. 16A-16C illustrated several diagrams of an exemplary release mechanism that can be incorporated within the lights in accordance with the embodiments of the present invention.
Figure 16B:
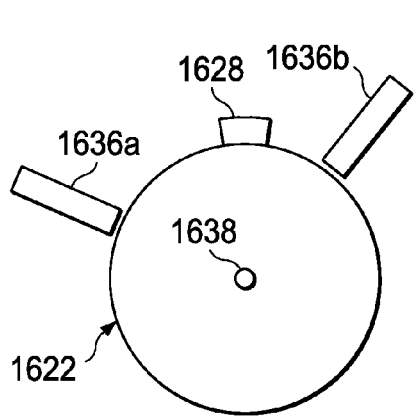
Figure 16C:
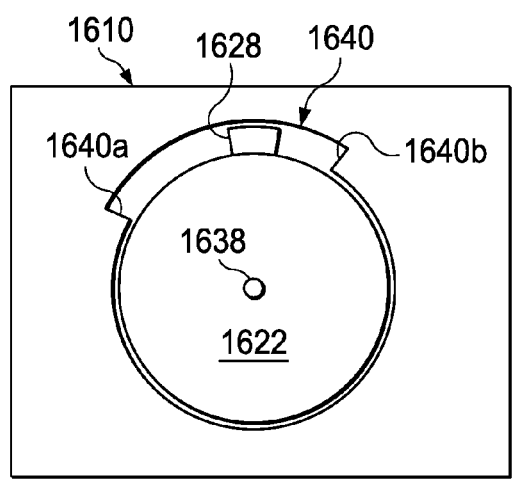

Referring to FIGS. 16A-16C, there are illustrated several diagrams used to explain the exemplary release mechanism 1620 in accordance with an embodiment of the present invention. In FIG. 16A, the one end 1610 has the magnetic field emission structure 1612 with a first code and the other end 1614 has the mirror image magnetic field emission structure 1616 also based on the first code. The magnetic field emission structure 1612 is physically secured to the release mechanism's magnetic field emission structure 1622 which has a second code. A separation layer 1624 made from a high permeability material may be placed between the two magnetic field emission structures 1612 and 1622 to keep their magnetic fields from interacting with one another. The two magnetic field emission structures 1612 and 1622 are configured so that they can turn about axis 1626 allowing them to be moved so as to allow attachment to and detachment from the magnetic field emission structure 1616 which enables the two ends 1610 and 1614 to be connected to and separated from one another. The release mechanism 1620 can also include at least one tab 1628 which is positioned to stop the movement of the two magnetic field emission structures 1612 and 1622. In addition, the release mechanism 1620 can include a key mechanism 1630 which has a magnetic field emission structure 1632 which is coded using the second code such that it corresponds to the mirror image of the magnetic emission field structure 1622. The key mechanism 1630 also includes a gripping mechanism 1634 that would typically be turned by hand. As shown, the key mechanism 1630 can be attached to the end 1610 by substantially aligning the two magnetic field structures 1622 and 1632. The gripping mechanism 1634 can then be turned about axis 1626 so as to align or misalign the two magnetic field emission structures 1612 and 1616, thereby attaching or detaching the two ends 1610 and 1614.

In FIG. 16B, there is depicted a general concept of using the tab 1628 so as to limit the movement of the two magnetic field emission structures 1612 and 1622 between two travel hunters 1636a and 1636b. The two magnetic field emission structures 1612 and 1622 are shown having a hole 1638 through their middle that enables them to turn about the axis 1626. The two travel limiters 1636a and 1636b might be any fixed object placed at desired locations that limit the turning radius of the two magnetic field emission structures 1612 and 1622.

FIG. 16C depicts an alternative approach where end 1610 includes a travel channel 1640 that is configured to enable the two magnetic field emission structures 1612 and 1622 to turn about the axis 1626 using hole 1638 and has travel limiters 1640a and 1640b that limit the turning radius. One skilled in the art would recognize that the tab 1628 and at least one travel limiter 1636a, 1636b, 1640a and 1640b are provided to simplify the detachment of key mechanism 1630 from the end 1610.

It is contemplated within the scope of the present invention that the embodiments illustrated herein could have more than one light source. Additionally the light sources could function to provide a light of variable intensity for example but not by way of limitation, a light of different intensities, consistent light, or a blinking light pattern. It is further contemplated that the light might provide one or more colors, provide one or more patterys (or symbols), and/or provide one or more beam sizes to include a variable beam size.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A light comprising:
a first portion and a second portion, said second portion being releasably securable to said first portion;
said first portion including a first field emission structure;
said second portion including a second field emission structure where said second portion is releasably secured to said first portion when said first and said second field emission structures are located proximate to one another and have a certain alignment with respect to one another, and where each of said first and second field emission structures include a plurality of field emission sources each having positions and polarities relating to a desired spatial force function that corresponds to a relative alignment of said first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defusing a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The light of claim 1, wherein said second portion is released from said first portion when at least one of said first field emission structure of said second field emission structure is moved away from said certain alignment with respect to one another.

3. The light of claim 2, and further including a release mechanism that turns said second field emission structure with respect to said first field emission structure so as to facilitate the release and attachment of said second field emission structure from said first field emission structure.

4. The light of claim 1, wherein said first field emission structure and said second field emission structure secure said first and second portions to environmentally isolate an interior portion of the light.

5. The light of claim 1, wherein said first portion includes a plurality of said first field emission structures, where each of said plurality of said first field emissions structures operable to interact with said second field emission structure of said second portion.

6. The light of claim 1, wherein said first portion includes a plurality of said first field emission structures and said second portion includes a plurality of said second field emission structures, where any one of said plurality of said first field emissions structures operable to interact any one of said plurality of said second field emissions structures.

7. The light of claim 1, and further including a second of said first field emission structures to connect to a field emission structure integrated with an object to facilitate the connection of the light to the object.

8. The light of claim 1, wherein said positions and said polarities of each field emission source of each said array plurality of field emission sources are determined in accordance with at least one correlation function.

9. The light of claim 8, wherein said at least on correlation function is in accordance with at least one code.

10. The light of claim 9, wherein said at least one code is at least one of a pseudorandom code, a deterministic code, and a designed code.

11. The light of claim 9, wherein said at least one code is one of a one dimensional code, a two dimensional code, a three dimensional code, and a four dimensional code.

12. The light of claim 1, wherein each field emission source of each said plurality of field emission sources has a corresponding field emission amplitude and vector direction determined in accordance with the desired spatial force function, wherein a separation distance between said first and second field emission structures and the relative alignment of said first and second field emission structures creates a spatial force in accordance with the desired spatial force function.

13. The light of claim 12, wherein said spatial force comprises at least one of an attractive spatial force or a repellant spatial force.

14. The light of claim 12, wherein said spatial force corresponds to a peak spatial force of said desired spatial force function when said first and second field emission structures are substantially aligned such that each field emission source of said first field emission structure substantially aligns with a corresponding field emission source of said second field emission structure.

15. The light of claim 1, wherein said field domain corresponds to first field emissions from said plurality of first field emission sources of said first field emission structure interacting with second field emissions from said plurality of second field emission sources of said second field emission structure.

16. The light of claim 1, wherein said polarities of the field emission sources comprise at least one of North-South polarities or positive-negative polarities.

17. The light of claim 1, wherein at least one of said field emission sources comprises a magnetic field emission source or an electric field emission source.

18. The light of claim 1, wherein at least one of said field emission sources comprises at least one of a permanent magnet, an electromagnet, an electret, a magnetized ferromagnetic material, a portion of a magnetized ferromagnetic material, a soft magnetic material, and a superconductive magnetic material.

19. A method for using a light, said method comprising the steps of:
   removing at least one end of the light from its body;
   accessing the interior of the light;
   attaching said at least one end of the light to said body, where said least one end has mounted thereon a first field emission structure; and
   wherein said body has mounted thereon a second field emission structure, where the at least one end is attached to said body when said first and second field emission structures are located next to one another and have a certain alignment with respect to one another, and where each of said first and second field emission structures comprise a plurality of field emission sources each having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

20. The method of claim 19, wherein said first step of removing at least one end of the light from its body further includes rotating the first and second field emission structures with respect to one another.

21. The method of claim 19, further comprising the step of:
   attaching the light to a second object, where the light has mounted thereon a third field emission structure, where the second object has attached thereto a fourth field emission structure, where each of said third and fourth field emission structures comprise a plurality of field emission sources each having positions and polarities relating to a second desired spatial force function that corresponds to a relative alignment of the third and fourth field emission structures within a second field domain, where the fourth field emission structure does not attach to the first field emission structure.

22. The method of claim 19, wherein the light is a selected from one of the following: a flashlight, a submersible pool light, an emergency light, a floating light, an underwater scuba light, an aquarium light or a vehicular light.

* * * * *